United States Patent
Lee

(10) Patent No.: US 8,423,087 B2
(45) Date of Patent: Apr. 16, 2013

(54) MOBILE TERMINAL WITH TOUCH SCREEN AND METHOD OF PROCESSING MESSAGE USING THE SAME

(75) Inventor: Myung Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 12/334,243

(22) Filed: Dec. 12, 2008

(65) Prior Publication Data

US 2010/0035658 A1 Feb. 11, 2010

(30) Foreign Application Priority Data

Aug. 5, 2008 (KR) .......................... 10-2008-0076482

(51) Int. Cl.
*H04B 1/38* (2006.01)
(52) U.S. Cl.
USPC ...................... 455/566; 455/575.1; 455/550.1; 455/415; 455/414.1
(58) Field of Classification Search .................. 455/566, 455/575.1, 550.1, 415, 414.1
See application file for complete search history.

(56) References Cited

U.S. PATENT DOCUMENTS

| | | | |
|---|---|---|---|
| 2005/0235037 A1 | 10/2005 | Tropartz | |
| 2006/0142997 A1* | 6/2006 | Jakobsen et al. | 704/10 |
| 2007/0140460 A1* | 6/2007 | Cai et al. | 379/218.01 |
| 2008/0051072 A1* | 2/2008 | Kraft et al. | 455/418 |
| 2008/0057926 A1* | 3/2008 | Forstall et al. | 455/415 |

FOREIGN PATENT DOCUMENTS

| | | |
|---|---|---|
| GB | 2 306 078 A | 4/1997 |
| WO | WO-02/071257 A2 | 9/2002 |

\* cited by examiner

*Primary Examiner* — Nghi H Ly
(74) *Attorney, Agent, or Firm* — Birch, Stewart, Kolasch & Birch, LLP

(57) ABSTRACT

A mobile terminal including a display unit configured to simultaneously display a message list region, a phonebook search region and a user input region on the touch screen, an activating unit configured to activate at least one of the message list region and the phonebook search region, an inputting unit configured to input contents in the user input region, and a control unit configured to control the display unit to display at least one message including the contents input through the user input region in the message list region when the user input region is activated, and to display at least one phonebook data item including the contents input through the user input region in the phonebook search region when the phonebook search region is activated.

16 Claims, 26 Drawing Sheets

MOBILE TERMINAL WITH TOUCH SCREEN AND METHOD OF PROCESSING MESSAGE USING THE SAME

CROSS-REFERENCE TO A RELATED APPLICATION

This application claims priority to Korean Application 10-2008-0076482 filed in Korea on Aug. 5, 2008, the entire contents of which are hereby incorporated in their entirety.

BACKGROUND OF THE INVENTION

1. Field of the Invention

The present invention relates to a mobile terminal and corresponding method for allowing easy access to required data when transmitting a message without searching a menu structure or changing a displayed image.

2. Description of the Related Art

Terminals such as personal computers, laptop computers, cellular phones and the like now include a variety of features such as multimedia functions including the ability to capture pictures or moving images, play music, arrange image files, play games, receive broadcasting programs, etc.

Generally, terminals can be divided into mobile terminals and stationary terminals. Further, mobile terminals can be classified into handheld terminals and vehicle mounted terminals, for example.

Because mobile terminals now provide a variety of functions, the user interface includes a complicated menu structure that the user has to search through to access any one or more of the functions. The mobile terminals also have small display screens so it is difficult to provide a menu system that includes the various functions and that can be easily accessed by the user. The complicated menu structure inconveniences the user.

SUMMARY OF THE INVENTION

Accordingly, one object of the present invention is to address the above-noted and other drawbacks.

Another object of the present invention is to provide a mobile terminal and corresponding method that makes it easy for a user to access data required for transmitting a message without searching a menu structure or changing a displayed image.

Yet another object of the present invention to provide a mobile terminal and corresponding method that minimizes the number of user's operations needed for transmitting a message.

To achieve these and other advantages and in accordance with the purpose of the present invention, as embodied and broadly described herein, the present invention provides in one aspect a mobile terminal including a display unit configured to simultaneously display a message list region, a phonebook search region and a user input region on the touch screen, an activating unit configured to activate at least one of the message list region and the phonebook search region, an inputting unit configured to input contents in the user input region, and a control unit configured to control the display unit to display at least one message including the contents input through the user input region in the message list region when the user input region is activated, and to display at least one phonebook data item including the contents input through the user input region in the phonebook search region when the phonebook search region is activated.

In another aspect, the present invention provides a method of controlling a mobile terminal, and which includes simultaneously displaying a message list region, a phonebook search region and a user input region on the touch screen, activating at least one of the message list region and the phonebook search region, inputting contents in the user input region, displaying at least one message including the contents input through the user input region in the message list region when the user input region is activated, and displaying at least one phonebook data item including the contents input through the user input region in the phonebook search region when the phonebook search region is activated.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
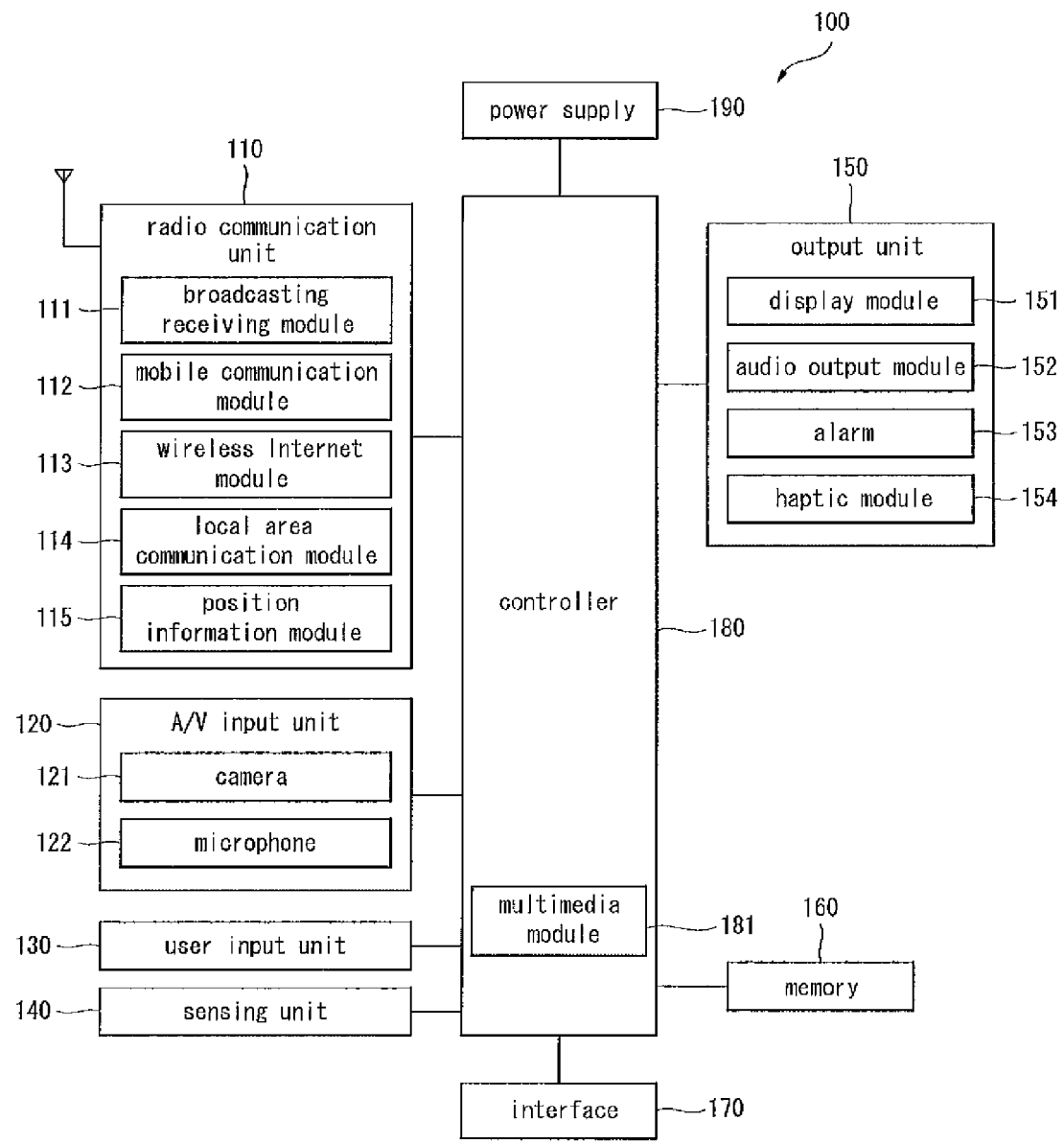
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Figure 2A:
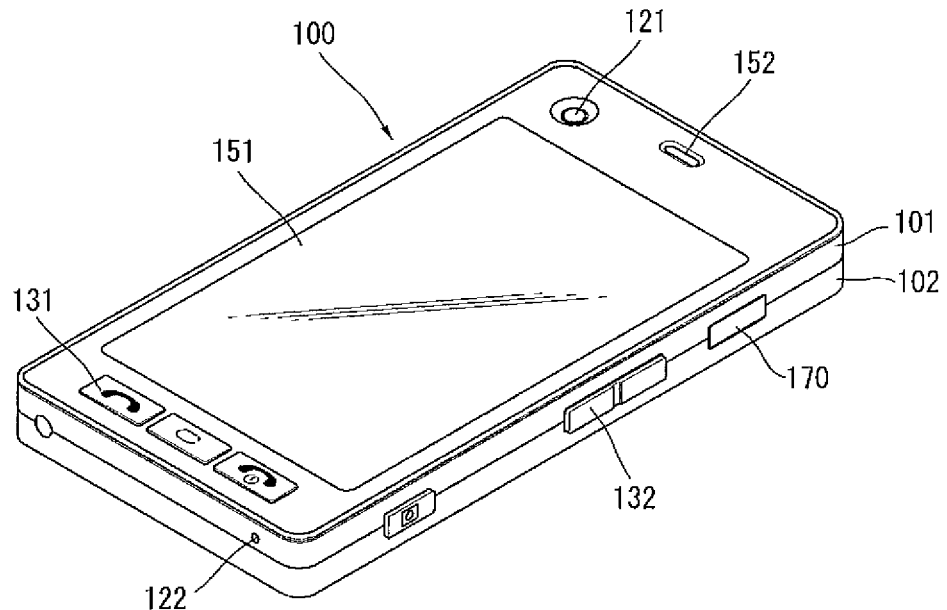
FIG. 2A is a front perspective view of a handheld terminal according to an embodiment of the present invention.

Next, FIG. 2a is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2a, the display unit 151, the audio output unit 152, the camera 121, a user input unit 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
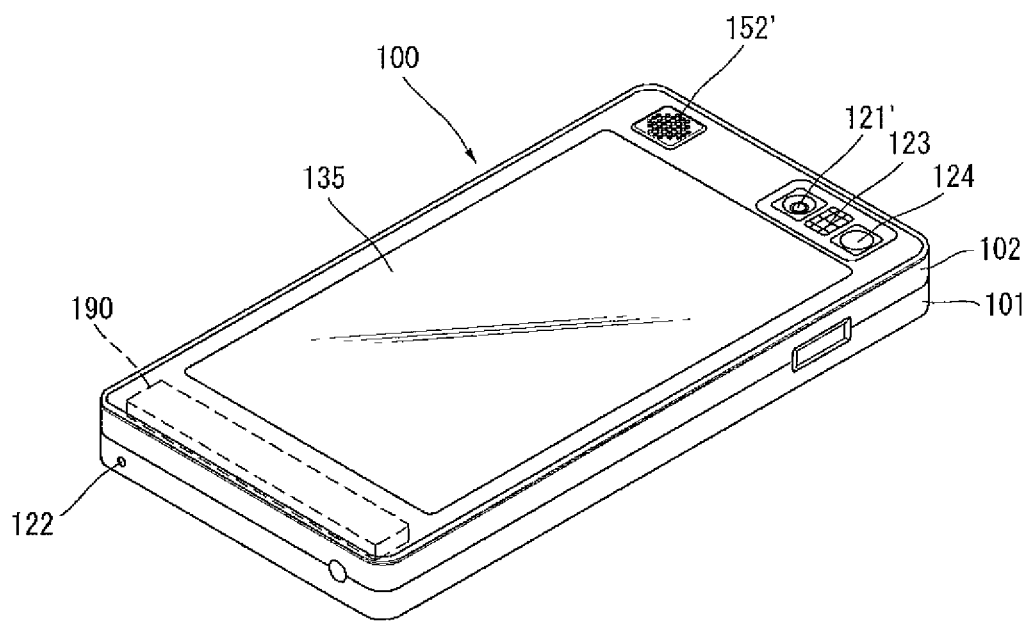
FIG. 2B is a rear perspective view of the handheld terminal shown in FIG. 2A according to an embodiment of the present invention.

Next, FIG. 2b is a rear perspective view of the handheld terminal shown in FIG. 2a according to an embodiment of the present invention. As shown in FIG. 2b, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2a.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2b, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2*a* and be used in a speaker phone mode when the terminal is used for a telephone call.

A broadcasting signal receiving antenna can also be additionally attached to a side of the terminal body in addition to an antenna for telephone calls. The antenna forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2*b* also illustrates a touch pad 135 for sensing touch additionally attached to the rear case 102 of the terminal 100. Further, the touch pad 135 can be a light transmission type as the display module 151. In this instance, when the display module 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display module 151 behind the display module 151. The touch panel 135 can also be identical to or smaller than the display unit 151 in size.

The interoperations of the display unit 151 and the touch pad 135 will now be described with reference to FIGS. 3*a* and 3*b*. In more detail, FIGS. 3*a* and 3*b* are front views of the handheld terminal 100 and are used for explaining an operating state of the handheld terminal according to an embodiment of the present invention.

The display module 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
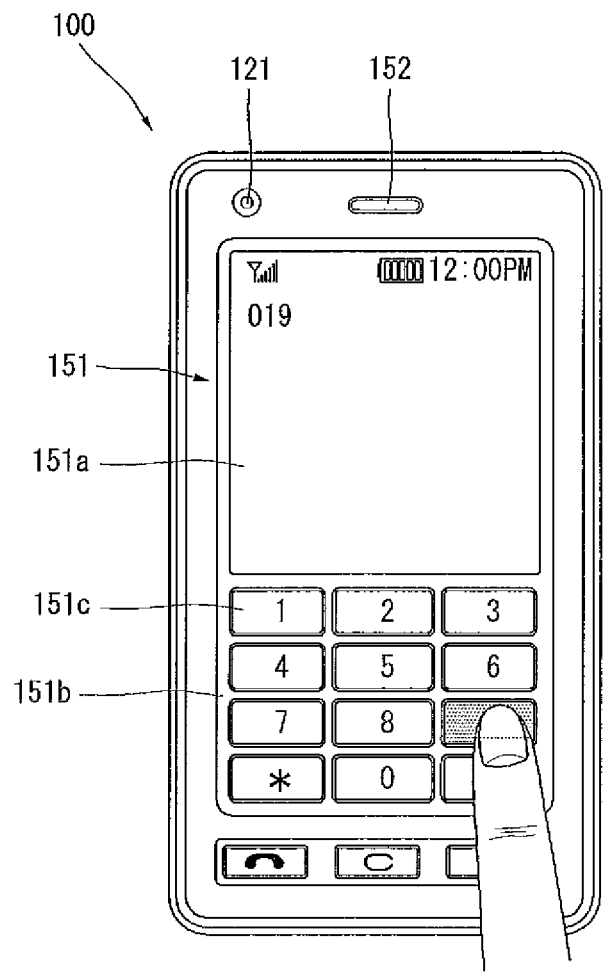
FIGS. 3a and 3b are front views of a handheld terminal used for explaining an operation of the handheld terminal according to an embodiment of the present invention.
Figure 3B:
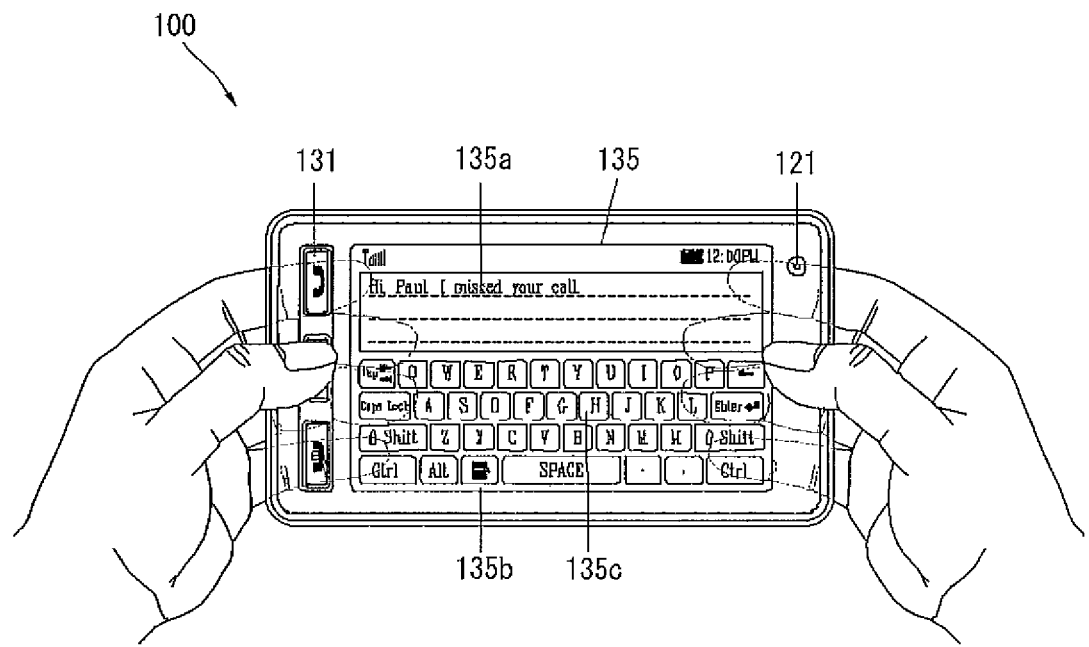

Further, FIG. 3*a* shows that touch applied to a soft key is input through the front side of the terminal body. The display module 151 can be a single area or can be divided into a plurality of regions. In the latter instance, the display unit 151 is constructed such that the plurality of regions interoperate with each other.

For example, and as shown in FIG. 3*a*, an output region 151*a* and an input region 151*b* are respectively displayed in upper and lower parts of the display module 151. The input region 151*b* displays soft keys 151*c* that represent numerals used to input numbers such as telephone numbers. Thus, when a soft key 151*c* is touched, a numeral corresponding to the touched soft key is displayed on the output region 151*a*. Further, when the user operates the first operating unit 116, a connection of a call corresponding to a telephone number displayed on the output region 151*a* is attempted.

Next, FIG. 3*b* is an overview of the mobile terminal 100 showing that touch applied to soft keys is input through the rear side of the terminal body. FIG. 3*b* also shows the landscape of the terminal body while FIG. 3*a* shows the portrait of the terminal body. In addition, the display unit 151 is constructed such that an output image is converted according to the direction in which the terminal body is located.

Further, FIG. 3*b* shows the operation of the handheld terminal in a text input mode. As shown, the display unit 151 includes a touch pad display 135 having an output region 135*a* and an input region 135*b*. A plurality of soft keys 135*c* indicating at least one of characters, symbols and numerals are also arranged in the input region 135*b*. Further, in this embodiment, the soft keys 135*c* are arranged in the form of qwerty keys.

Thus, when the soft keys 135*c* are touched through the touch pad 135, the characters, numerals and symbols corresponding to the touched soft keys 135*c* are displayed on the output region 135*a*. Touch input through the touch pad 135 can prevent the soft keys 135*c* from being covered with user's fingers when the soft keys 135*c* are touched as compared to touch input through the display unit 151. Further, when the display unit 151 and the touch pad 135 are transparent, the user can see his or her fingers located behind the terminal body, and thus can select items by touching the backside or surface of the displayed keys 135*c*.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

The proximity sensor described with reference to FIG. 1 will now be explained in more detail with reference to FIG. 4. That is, FIG. 4 is a conceptual diagram used for explaining a proximity depth of the proximity sensor.

Figure 4:
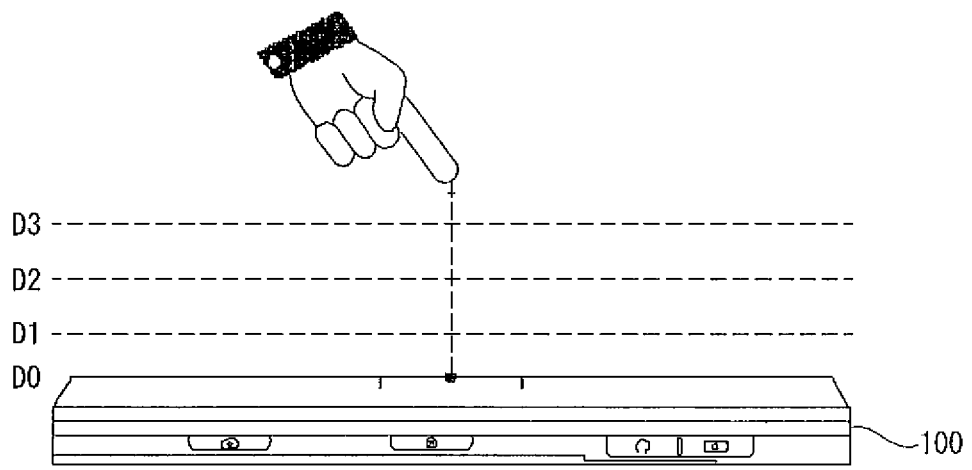
FIG. 4 is a conceptual diagram for explaining a proximity depth of a proximity sensor.

As shown in FIG. 4, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

Figure 5:
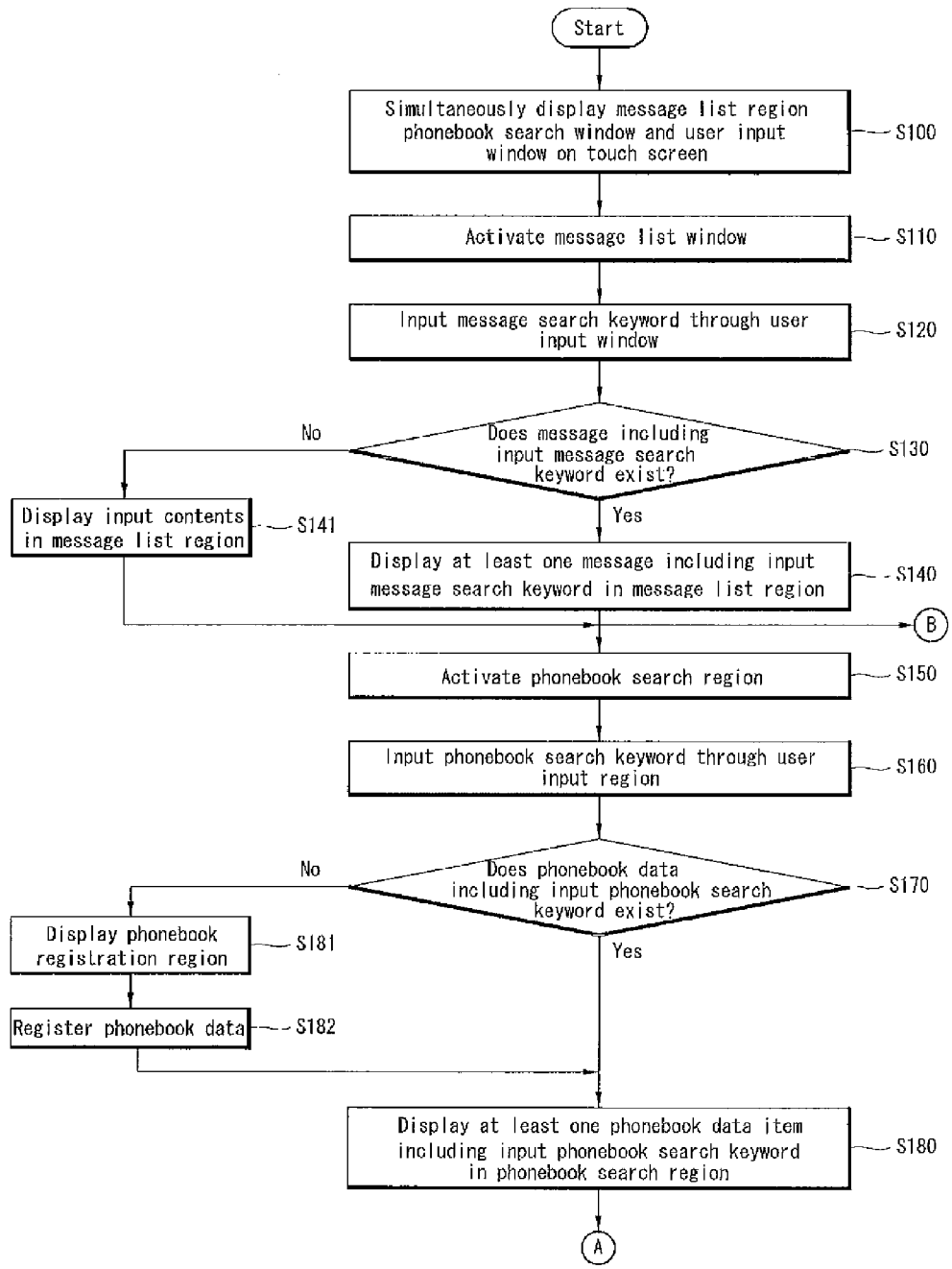
FIG. 5 is a flow chart illustrating a method of processing a message in a mobile terminal with a touch screen according to a first embodiment of the present invention.

Next, FIG. 5 is a flow chart illustrating a method of processing a message in a mobile terminal with a touch screen according to a first embodiment of the present invention. FIGS. 6a-6e, 7, 8a and 8b are overviews of display screens illustrating images displayed when the steps of FIG. 5 are performed. The display module 151 is referred to as a touch screen 151 hereinafter.

Figure 6A:
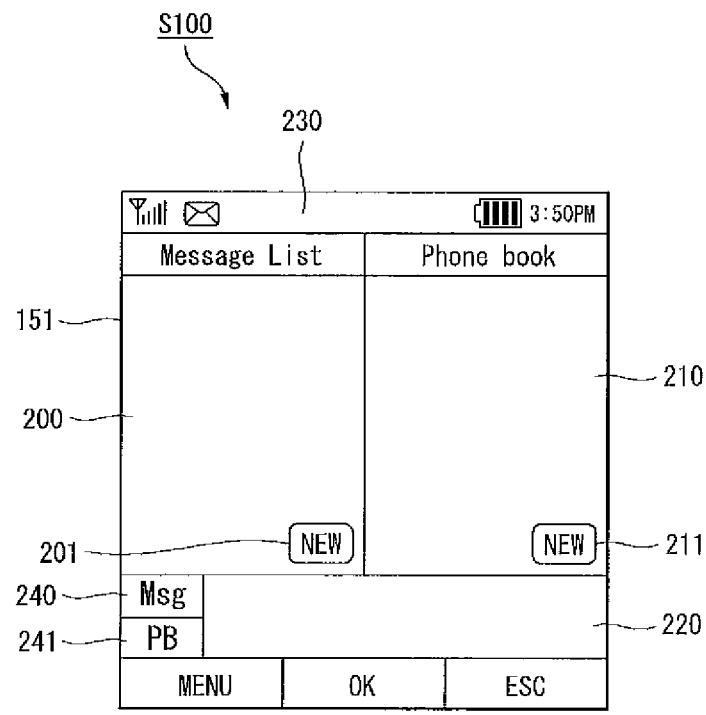
FIGS. 6a-6e, 7, 8a and 8b are overviews of display screens illustrating examples of images displayed when the steps in FIG. 5 are performed.

As shown in FIGS. 5 and 6a, the controller 180 simultaneously displays a message list region 200, a phonebook search region 210 and a user input region 220 on the touch screen 151 (step S100). In addition, the message list region 200 is a region for displaying all of or part of a message list stored in the memory 160. For example, a user can register/store in advance frequently used expressions, sentences and messages in the message list.

The phonebook search region 210 is a region for displaying all of or part of phonebook data included in a phonebook stored in the memory 160. For example, the phonebook includes at least one phonebook data item, which can include names, telephone numbers, email addresses, home pages, pictures, etc.

Also, the user input region 220 is a region through which the user can input or search for information. In addition, the user can input information through the user input region 220 in various manners. For example, when the user touches the user input region 220, the controller 180 can provide a virtual keyboard including various characters, numerals and symbols. Furthermore, when the user writes characters, numerals or symbols in the user input region 220 with a finger or a stylus pen, the controller 180 performs character recognition to recognize the written contents so as to input information.

Also, as shown in FIG. 6a, which illustrates a screen displayed when step S100 is performed, the message list region 200 includes a message registration button 201 for registering a new message. In addition, the phonebook search region 210 includes a phonebook registration button 211 for registering new phonebook data.

Further, the reference numeral 230 denotes an indicator region for providing the state and information of the mobile terminal according to an embodiment of the present invention. For example, the indicator region 230 can display information such as radio signal sensitivity, existence of a new message, remaining capacity of a battery and time, etc.

The reference numeral 240 represents a message activation button for activating the message list region 200, and the reference numeral 241 denotes a phonebook activation button for activating the phonebook search region 210. The message activation button 240 and the phonebook activation button 241 can also be integrated into a single button and operated in a toggle manner. Although the present invention is not limited to the display screen shown in FIG. 6a, FIG. 6a is used as a basic screen in the following description.

Figure 6B:
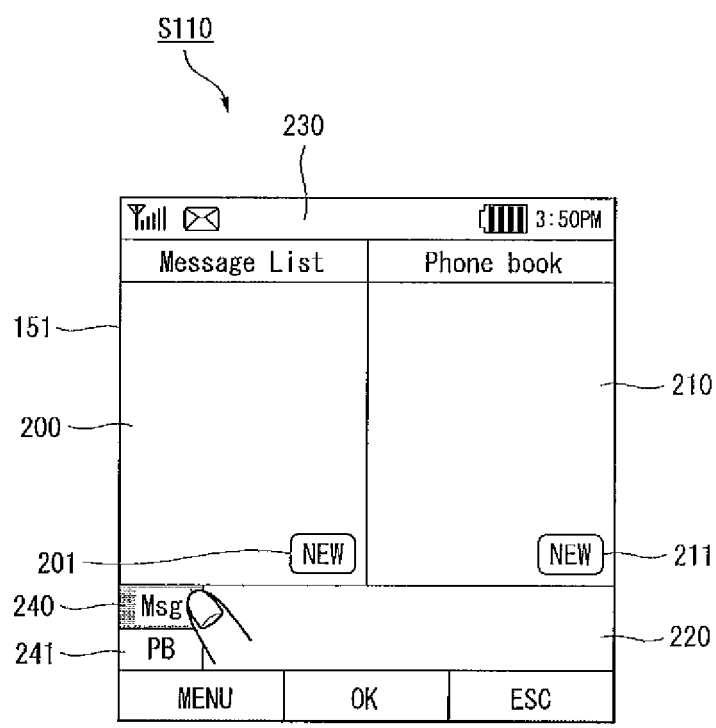

Then, as shown in FIG. 5, the controller 180 activates the message list region 200 (step S110). The operation of step S110 can be performed in various manners. For example, the user can touch the message activation button 240 with a finger or a stylus pen to activate the message list region 200, as shown in FIG. 6b.

Figure 6C:
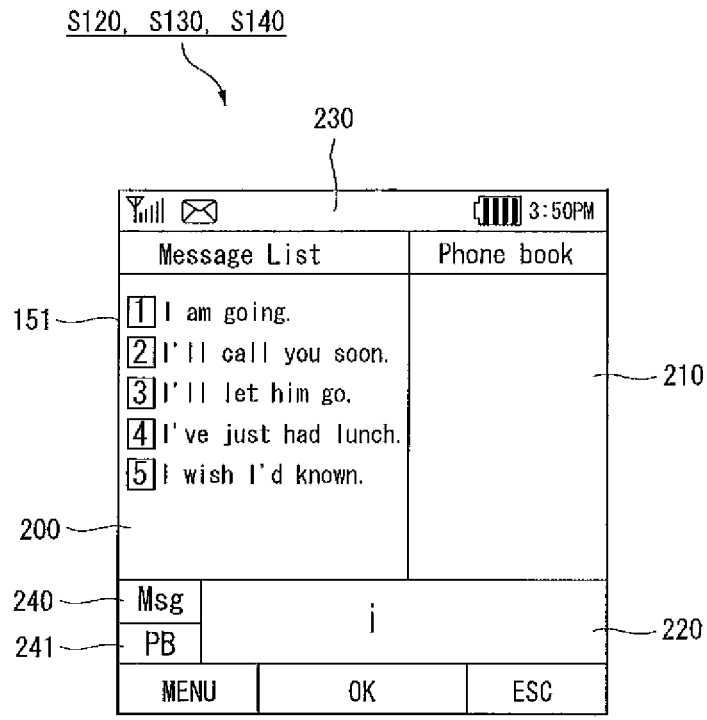

When the message list region 200 is activated, the user inputs a message search character or keyword through the user input region 220 (step S120). For example, the user can input the character "i" through the user input region 220, as shown in FIG. 6c. The controller 180 then determines whether messages including the input message search character or keyword are stored in the memory 160 (step S130).

For example, the controller 180 can search the message list stored in the memory 160 to determine whether messages including the input message search character or keyword exist in the memory 160. Further, the mobile terminal 100 according to one embodiment of the present invention provides the user with a user interface capable of setting a search range for performing the operation in step S130. For example, the user can set the mobile terminal such that the operation of step S130 is performed only for the message list stored in the memory 160. Alternatively, the user can set the mobile terminal such that the operation in step S130 is performed for all texts stored in the memory 160.

Also, when the controller 180 determines that messages including the input message search character or keyword exist in the memory 160 (Yes in step S130), the controller 180 displays at least one message including the input message search character or keyword in the message list region 200 (step S140). For example, the controller 180 can display all messages starting with the character "i" input by the user in the message list region 200 as shown in FIG. 6c. That is, FIG. 6c displays five previously stored messages starting with the character "i" in the message list region 200.

Figure 7:
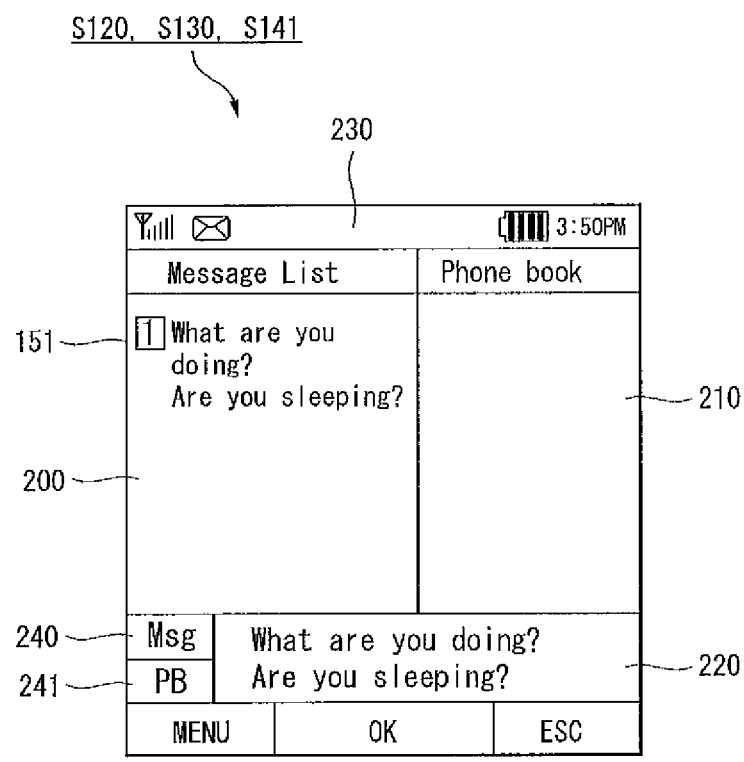

Alternatively, when the controller 180 determines that no message including the input message search character or keyword exist in the memory 160 (No in step S130), the controller 180 displays the contents input in step S120 in the message list region 200 (step S141). FIG. 7 is an overview of a display screen illustrating an example of an image displayed when the operation in step S141 is performed.

In more detail, when the operations in steps S120 and S130 are performed, a message including the input message search character or keyword may not exist in the message list or the memory 160. In this instance, the controller 180 can display the contents input in step S120 in the message list region 200. As shown in FIG. 7, the contents displayed in the message list region 200 can be part of the contents input in step S120.

The controller 180 can also display the input contents in the message list region 200, and simultaneously, automatically register the input contents in the message list or additionally provide a graphic user interface (GUI) that prompts the user about whether the input contents are registered.

Figure 6D:
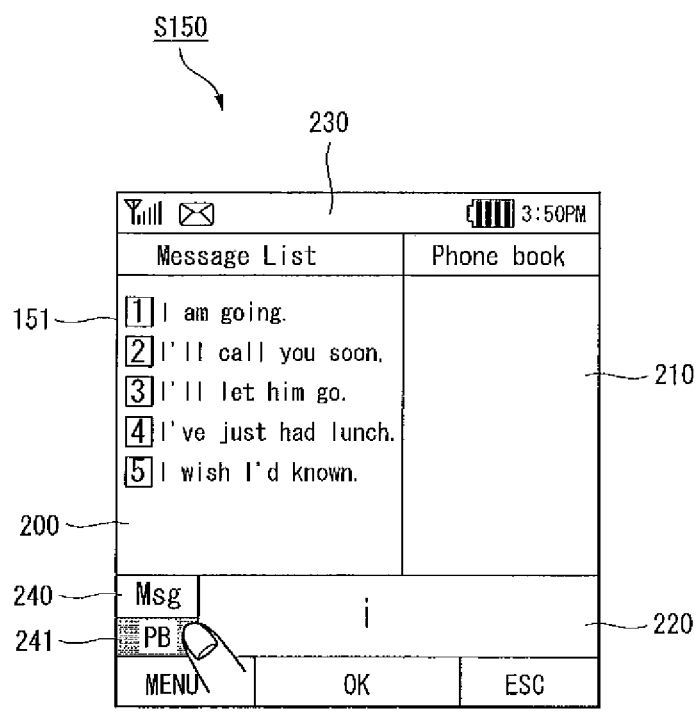

Further, as shown in FIG. 5, the controller 180 activates the phonebook search region 210 (step S150). The operation in step S150 can be performed in various manners. For example, the user can touch the phonebook activation button 241 with his or her finger or a stylus pen to activate the phonebook search region 210, as shown in FIG. 6d.

Figure 6E:
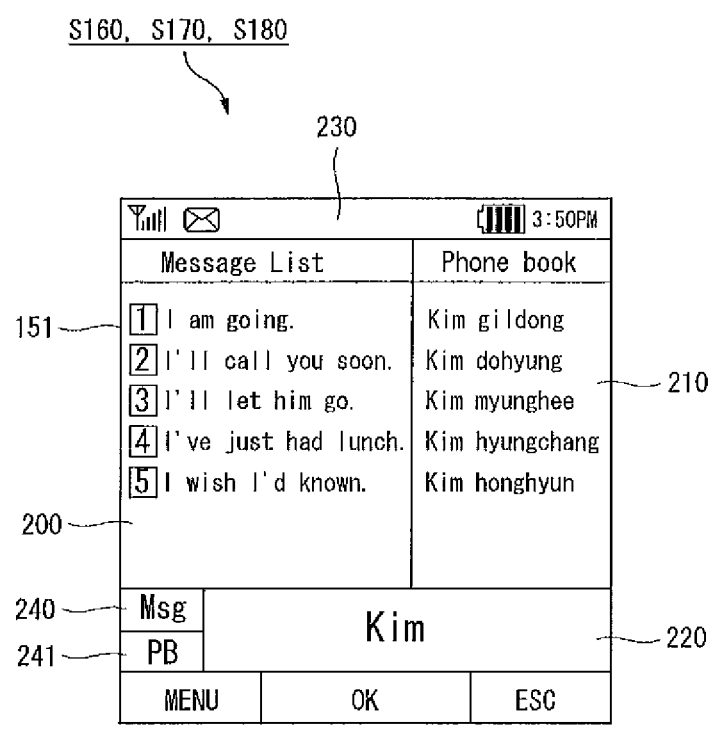

When the phonebook search region 210 is activated, the user can input a phonebook search character or keyword through the user input region 220 (step S160). In addition, the phonebook search character or keyword can be input in various manners. For example, the user can input the keyword "Kim" by writing the name in cursive script through the user input region 220, as shown in FIG. 6e.

The controller 180 then determines whether phonebook data including the input phonebook search character or keyword exists in the memory 160 (step S170). For example, the controller 180 can search the phonebook stored in the memory 160 to determine whether the phonebook data including the input phonebook search character or keyword exists in the memory 160.

When the phonebook data including the input phonebook search character or keyword exists in the memory 160 (Yes in step S170), the controller 180 displays at least one phonebook data item including the input phonebook search character or keyword in the phonebook search region 210 (step S180). For example, the controller 180 can search the phonebook stored in the memory 160 for names starting with "Kim" input by the user in step S160 and display the search result in the phonebook search region 210, as shown in FIG. 6e.

Figure 8A:
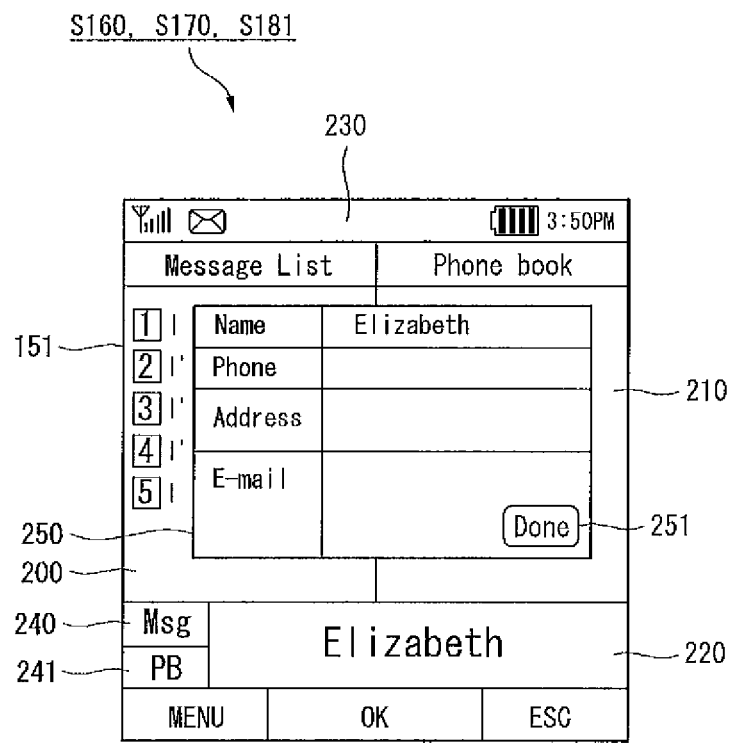

When the phonebook data including the input phonebook search character or keyword does not exist in the memory 160 (No in step S170), the controller 180 can display a phonebook registration region 250 (see FIG. 8a) on the touch screen 151 (step S181). Referring to FIG. 8a, when the user inputs "Elizabeth" through the user input region 220 in step S160, for example, phonebook data including "Elizabeth" may not exist in the memory 160. At this time, the controller 180 can determine that "Elizabeth" is new phonebook data and display the phonebook registration region 250 on the touch screen 151.

Figure 8B:
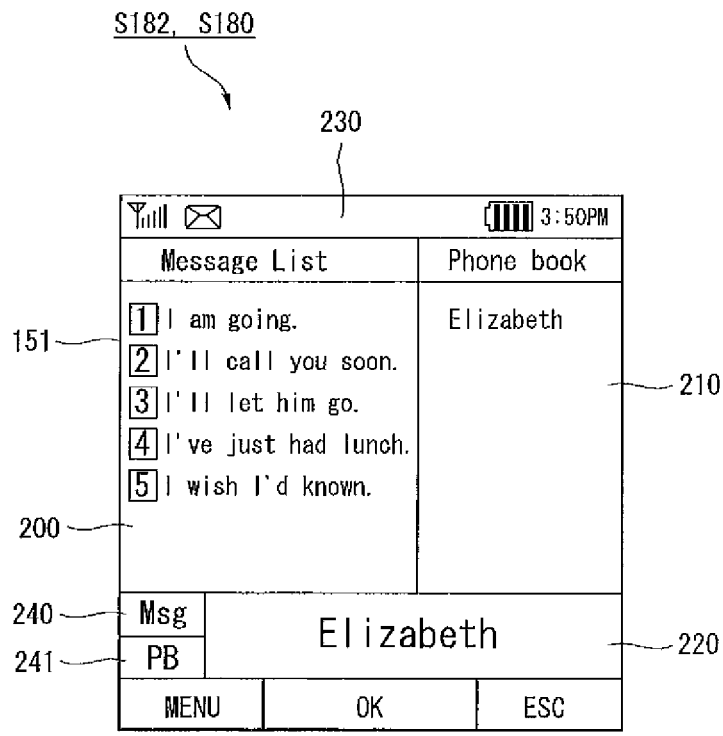

When the phonebook registration region 250 is displayed, the contents input through the user input region 220 can be automatically input to a name field of the phonebook registration region 250, as shown in FIG. 8a. The user can also register new phonebook data through the phonebook registration region 250 (step S182). For example, when the user inputs phonebook data through the phonebook registration region 250 and selects a completion button 251 shown in FIG. 8a, the input phonebook data is registered in the phonebook stored in the memory 160 and the newly registered phonebook data is displayed in the phonebook search region 210 as shown in FIG. 8b.

The message search character or keyword and the phonebook search character or keyword described in the present invention include not only words having meaning but also phonemes, syllables and words for searching for messages or phonebook.

In addition, both of the message list region and the phonebook search region can be activated to simultaneously display at least one message in the message list region and at least one phonebook data in the phonebook search region. Thus, the user can search both the message list region and phonebook search region at the same time, which is useful when searching for a common term in both windows.

Transmission of a Single Message to a Single Person

Figure 9:
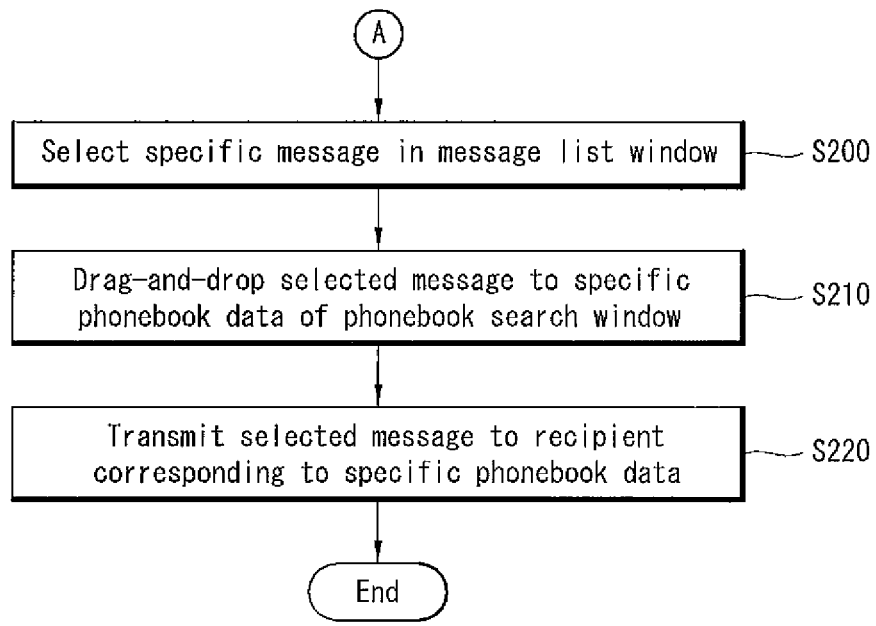
FIG. 9 is a flow chart illustrating a method of processing a message in a mobile terminal with a touch screen according to a second embodiment of the present invention.
Figure 10A:
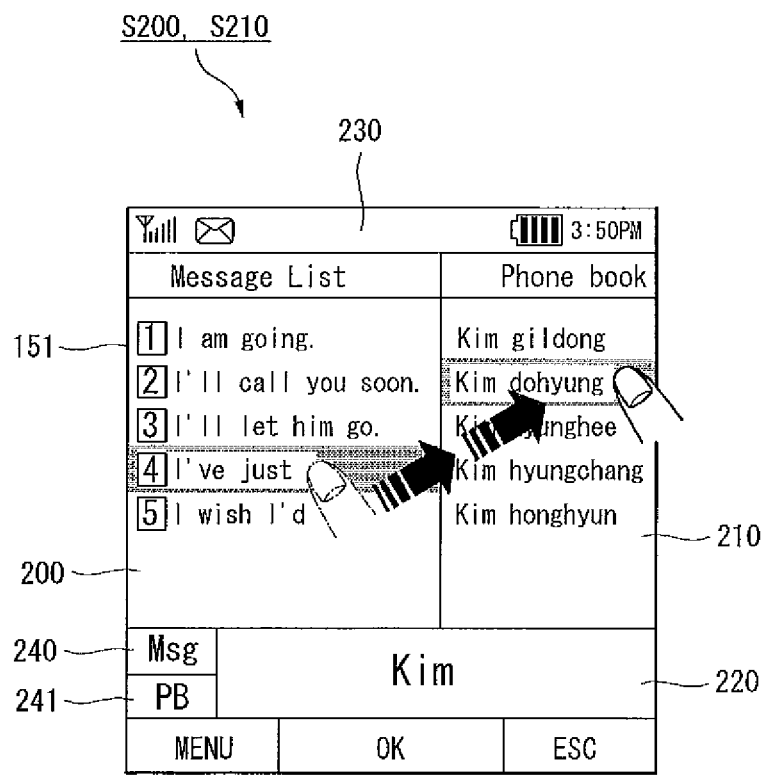
FIGS. 10a and 10b are overviews of display screens illustrating examples of images displayed on the screen of the mobile terminal when the steps in FIG. 9 are performed.
Figure 10B:
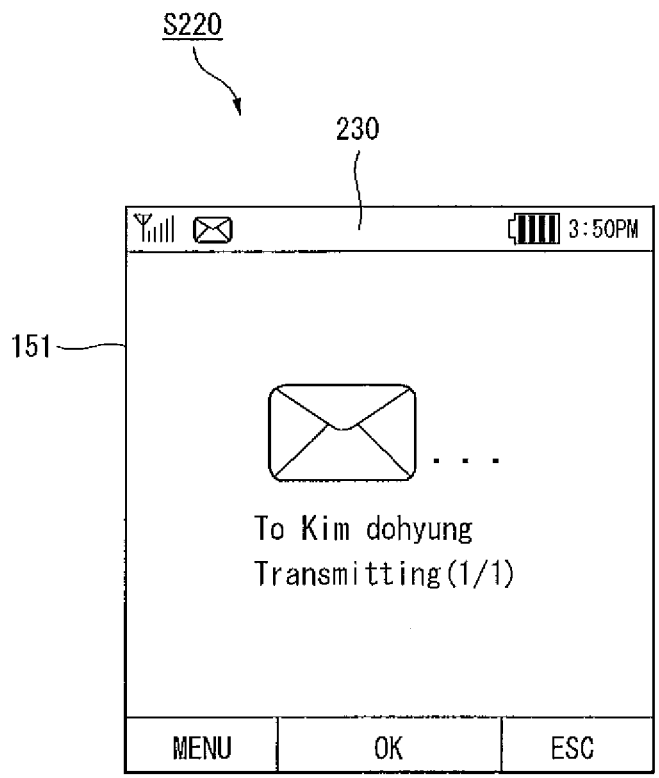

Next, FIG. 9 is a flow chart illustrating a method of processing a message in a mobile terminal with a touch screen according to a second embodiment of the present invention. FIGS. 10a and 10b are overviews of display screens showing examples of images displayed on the screen of the mobile terminal when the steps in FIG. 9 are performed. In this embodiment, it is assumed that the method of processing a message in a mobile terminal with a touch screen according to the second embodiment of the present invention is performed starting from the step shown in FIG. 6e for convenience of explanation.

In more detail, the user selects a specific message from the at least one message displayed in the message list region 200 on the screen shown in FIG. 6e (step S200) and drags-and-drops the selected message to specific phonebook data displayed in the phonebook search region 210 (step S210), as shown in FIG. 10a. For example, the user can touch "I've just had lunch" in the message list region 200 and move the touched contents to "Kim dohyung" displayed in the phonebook search region 210.

In addition, the "drag-and-drop" operation is an operation of touching a specific object or a specific region and moving the touched object/region to another object or region. The "drag-and-drop" operation can also include a "touch-and-drag" operation.

The controller 180 then transmits the message selected in step S200 to a recipient corresponding to the specific phonebook data to which the message is dragged-and-dropped in step S210 (step S220). Further, the recipient can correspond to a telephone number or an e-mail address.

The controller 180 can also transmit the selected message through the mobile communication module 112 when the recipient corresponds to a telephone number, and transmit the selected message through the wireless Internet module 113 when the recipient corresponds to an e-mail address. The recipient can also correspond to device identification searched through local area communication. In this instance, the controller 180 can transmit the selected message through the local area communication module 114. As shown in FIG. 10b, the controller 180 transmits a message including "I've just had lunch" to "Kim dohyung" through the mobile communication module 112, for example.

Transmission of Multiple Messages to a Single Person

Figure 11:
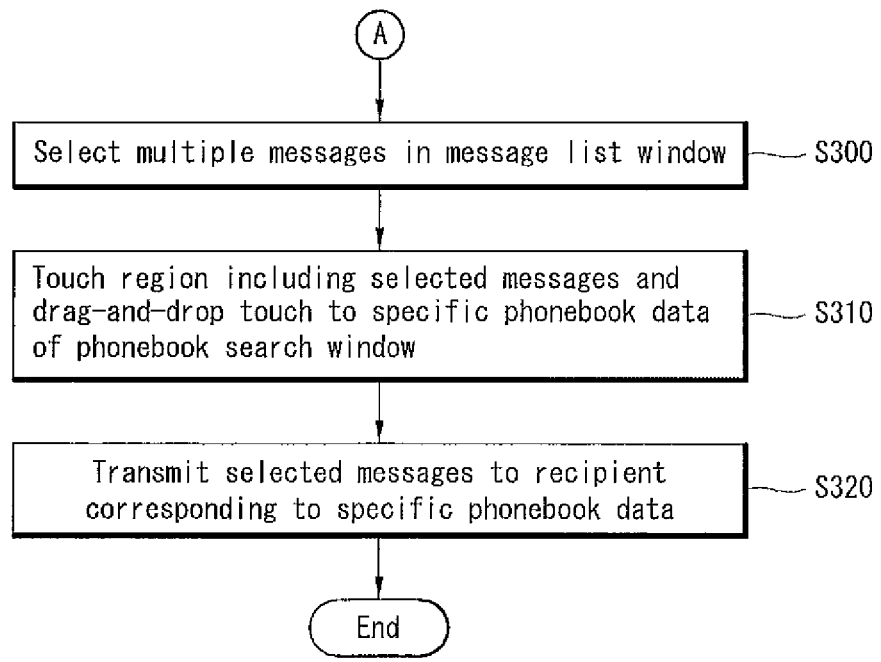
FIG. 11 is a flow chart illustrating a method of processing a message in a mobile terminal with a touch screen according to a third embodiment of the present invention.
Figure 12A:
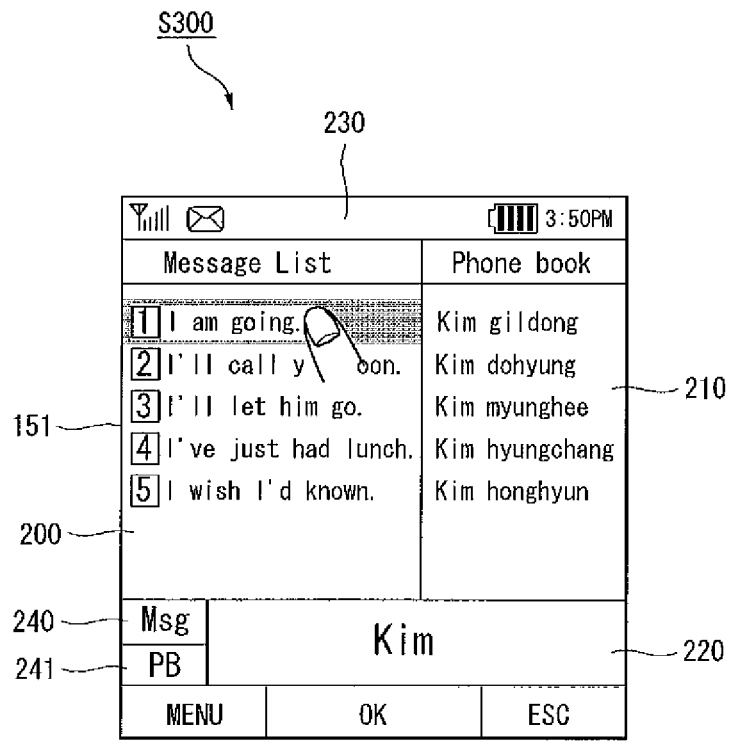
FIGS. 12a-12c are overviews of display screens illustrating examples of images displayed on the screen of the mobile terminal when the steps in FIG. 11 are performed.
Figure 12B:
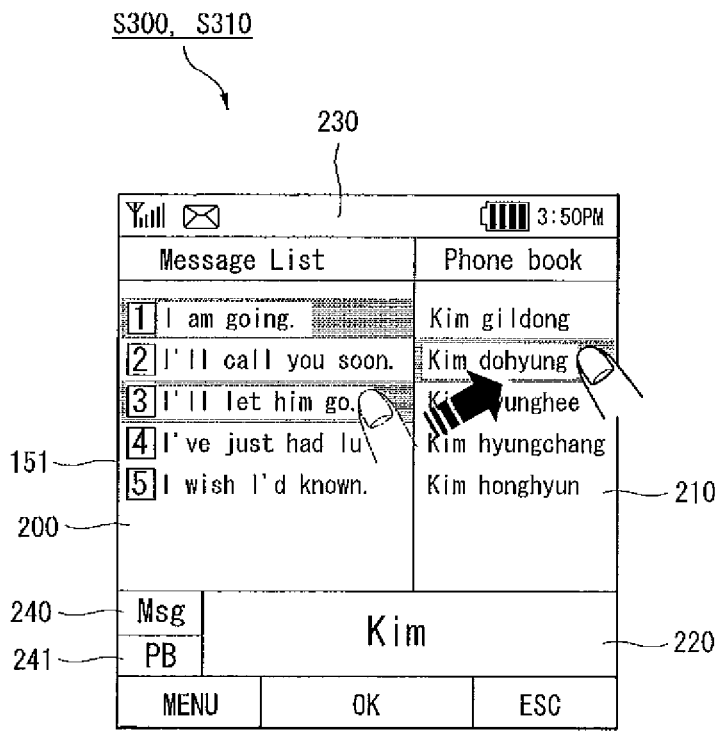
Figure 12C:
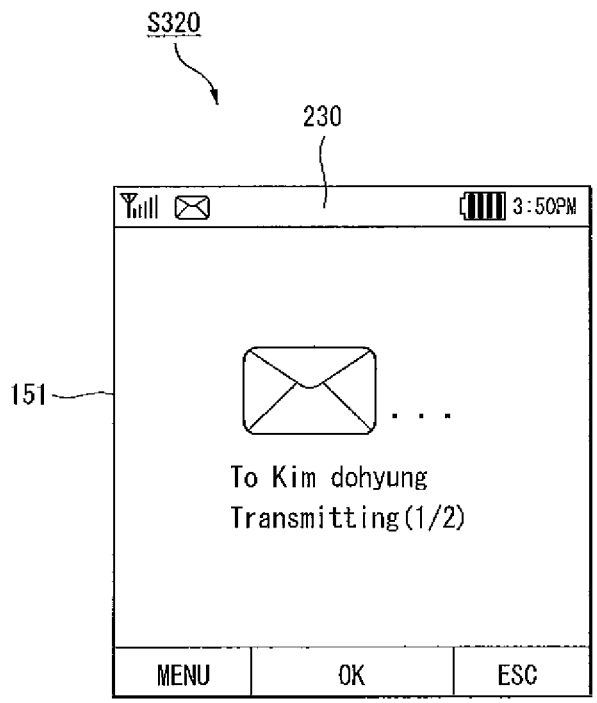

FIG. 11 is a flow chart of a method of processing a message in a mobile terminal with a touch screen according to a third embodiment of the present invention. FIGS. 12a-12c are overviews of display screen showing examples of images displayed on the screen of the mobile terminal when steps in FIG. 11 are performed. Again, this embodiment assumes the method is performed starting from the step shown in FIG. 6e for convenience of explanation.

As shown in FIG. 11, the user selects a plurality of messages from the message list displayed in the message list region 200 on the screen shown in FIG. 6e (step S300), and drags-and-drops the selected messages to specific phonebook data displayed in the phonebook search region 210 (step S310). For example, the user can touch "I am going" in the message list region 200 to select "I am going", as shown in FIG. 12a.

In this state, the user can also touch "I'll let him go" in the message list region 200 to select another message and move both of the touched messages to "Kim dohyung" of phonebook search region 210 as shown in FIG. 12B. The user can also touch "I'll let him go" with their finger, take their finger off the touch screen 151, touch another point of the message list region 200 to select a second message, and then move the touch portions to "Kim dohyung" of phonebook search region 210.

Further, as shown in FIG. 11, the controller 180 transmits the plurality of messages selected in step S300 to a recipient corresponding to the specific phonebook data to which the selected messages are dragged-and-dropped (step S320). As discussed above, the recipient corresponds to various phonebook data items such as a telephone number, e-mail address, etc. For example, FIG. 12c illustrates the first message including "I am going" and the second message "I'll let him go" being transmitted to "Kim dohyung".

Transmission of at Least One Message to N People

Figure 13:
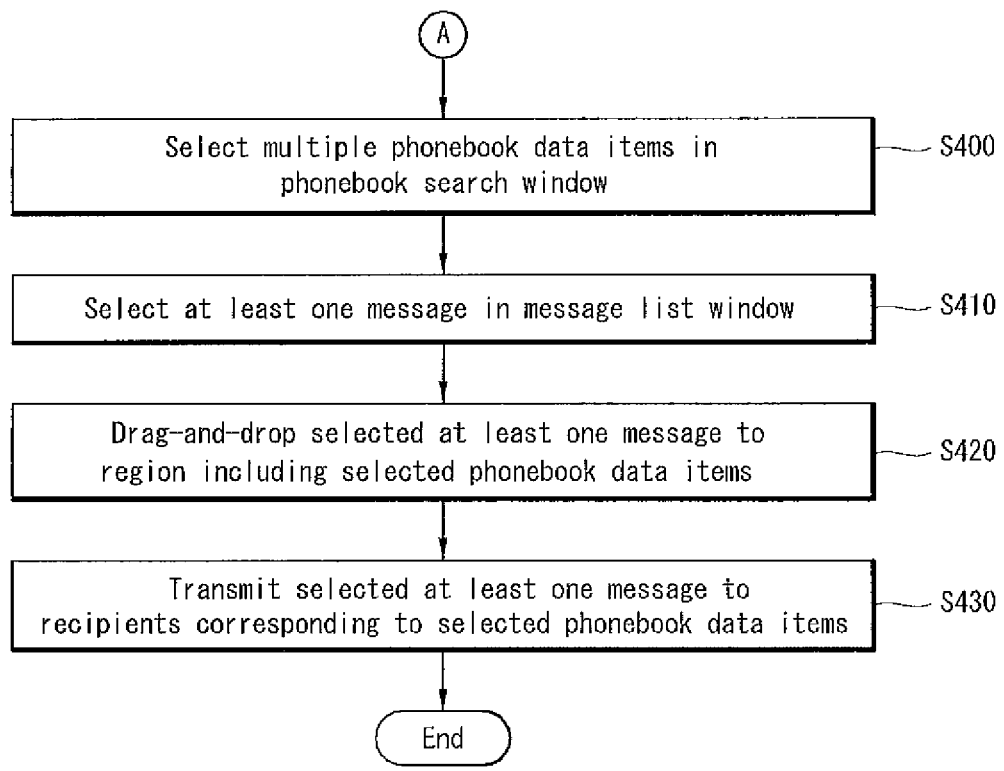
FIG. 13 is a flow chart illustrating a method of processing a message in a mobile terminal with a touch screen according to a fourth embodiment of the present invention.

Next, FIG. 13 is a flow chart illustrating a method of processing a message in a mobile terminal with a touch screen according to a fourth embodiment of the present invention. FIGS. 14a-14d, 15 and 16a-16e are overviews of display screens illustrating examples of images displayed on the screen of the mobile terminal when the steps in FIG. 13 are performed. Again, this embodiment assumes the method is performed starting from the step shown in FIG. 6e for convenience of explanation.

Figure 14A:
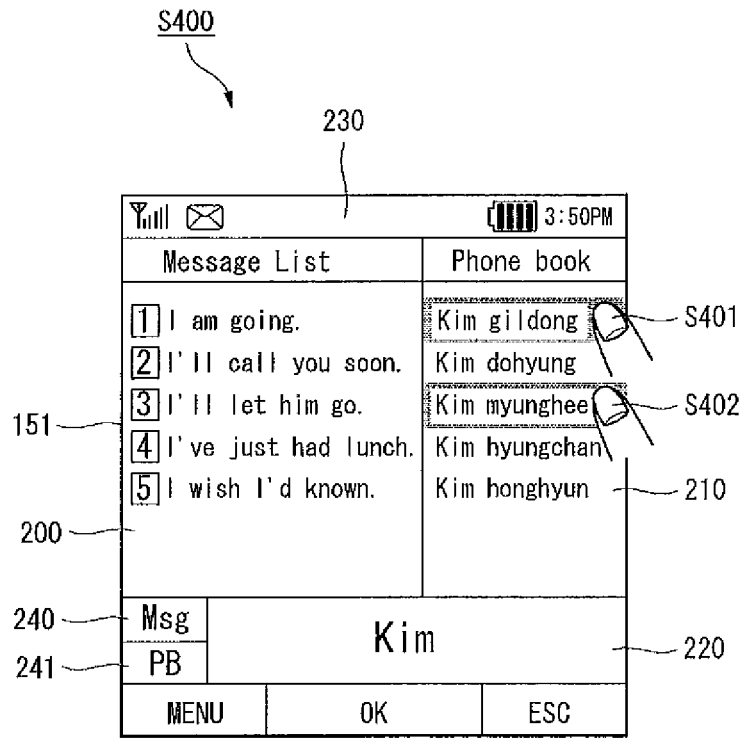
FIGS. 14a-14d, 15 and 16a-16e are overviews of display screens illustrating examples of images displayed on the screen of the mobile terminal when the steps in FIG. 13 are performed.

As shown in FIG. 13, the user selects a plurality of phonebook data items in the phonebook search region 210 (step S400). For example, as shown in FIG. 14a, the user can touch "Kim gildong" in step S401 and touch "Kim myunghee" in step S402 to select two recipients.

Figure 14B:
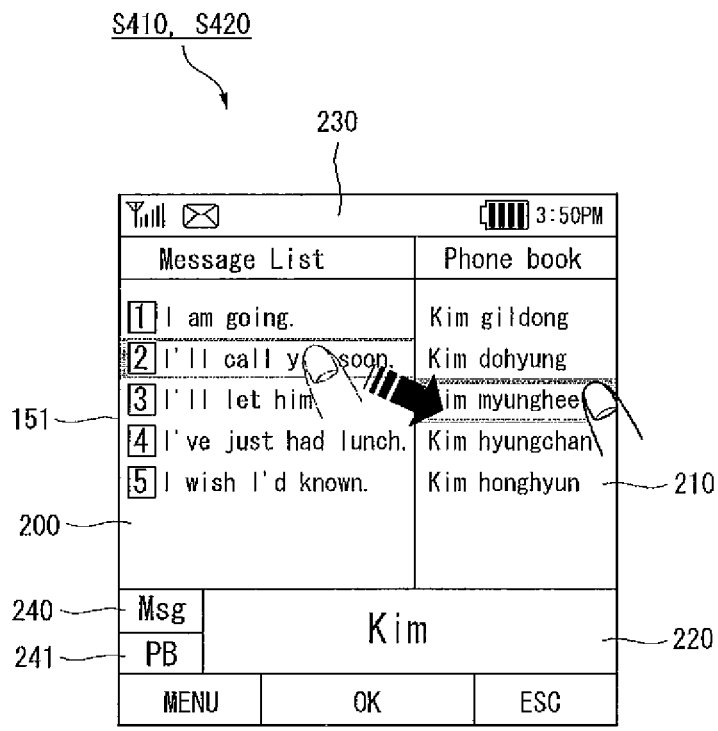

The user then selects at least one message in the message list region 200 (step S410) and drags-and-drops the selected at least one message to a region including the selected phonebook data items (step S420). In addition, the user may drag-and-drop the selected at least one message to an arbitrary point of the phonebook search region 210. For example, the user can touch "I'll call you soon" with their finger and then move the touched portion to the phonebook search region 210 as shown in FIG. 14b.

Figure 14C:
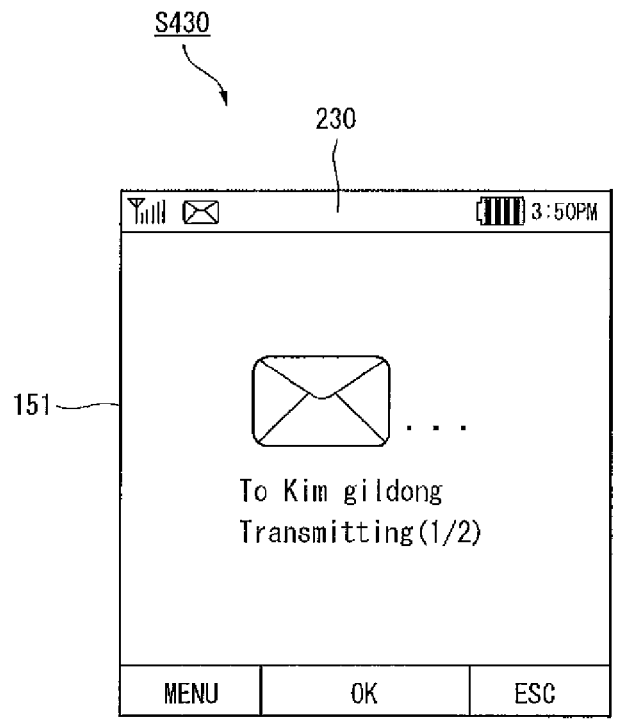
Figure 14D:
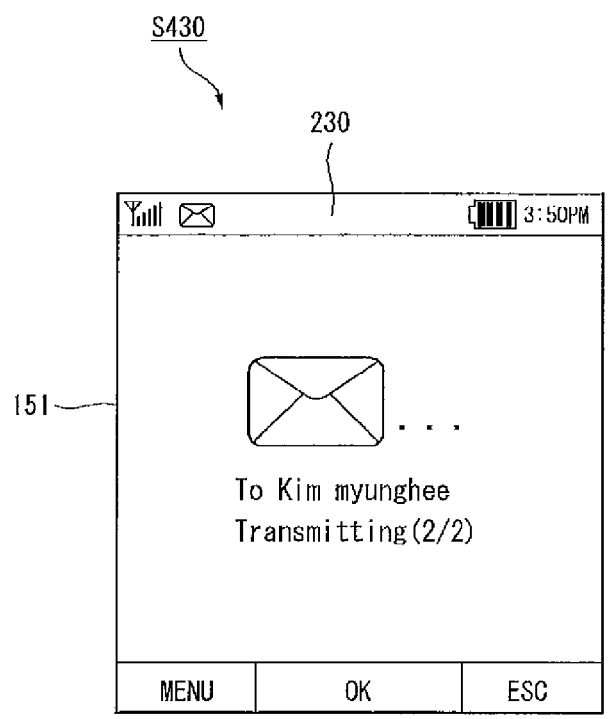

The controller 180 then transmits the at least one selected message to recipients corresponding to the selected plurality of phonebook data items (step S430), as shown in FIGS. 14c and 14d. Further, FIG. 14c illustrates an example of transmitting "I'll call you soon" to "Kim gildong", and FIG. 14d illustrates an example of transmitting "I'll call you soon" to "Kim myunghee".

Figure 15:
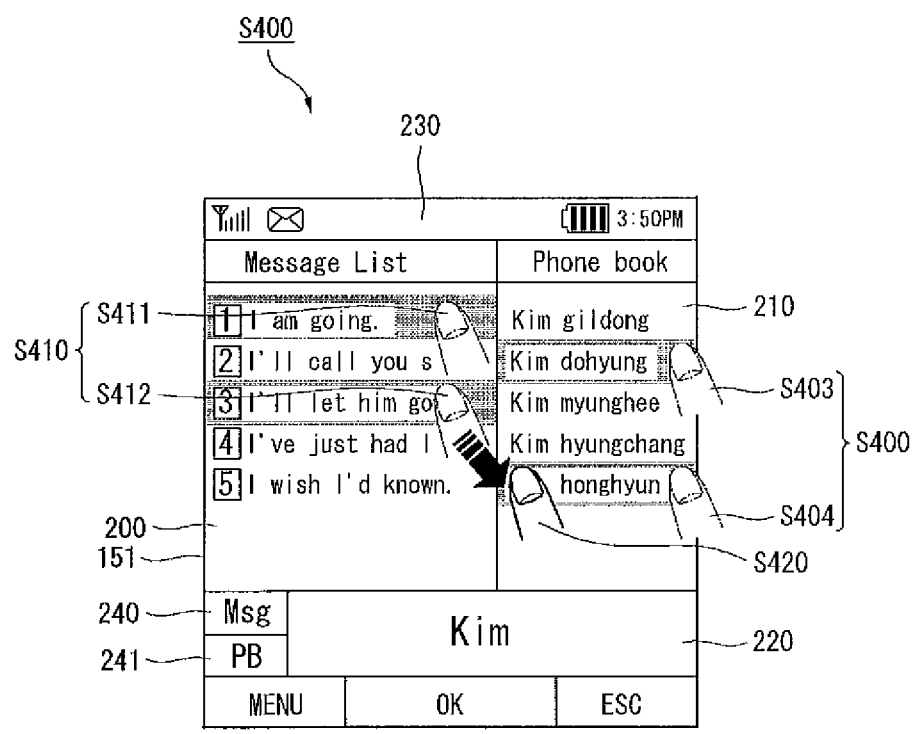

In addition, FIG. 15 is an overview of a display screen illustrating an example of selecting a plurality of messages in step S410. For example, the user sequentially touches "Kim dohyung" and "Kim honghyun" in the phonebook search region 210 in steps S403 and S404 to select two recipients in step S400. Subsequently, the user sequentially touches "I am going" and "I'll let him go" in steps S411 and S412 to select two messages in step S410. Then, the user moves the touch portions performed in step S412 to the phonebook search region 210 in step S420. The controller 180 then transmits the two messages to the two recipients.

Figure 16A:
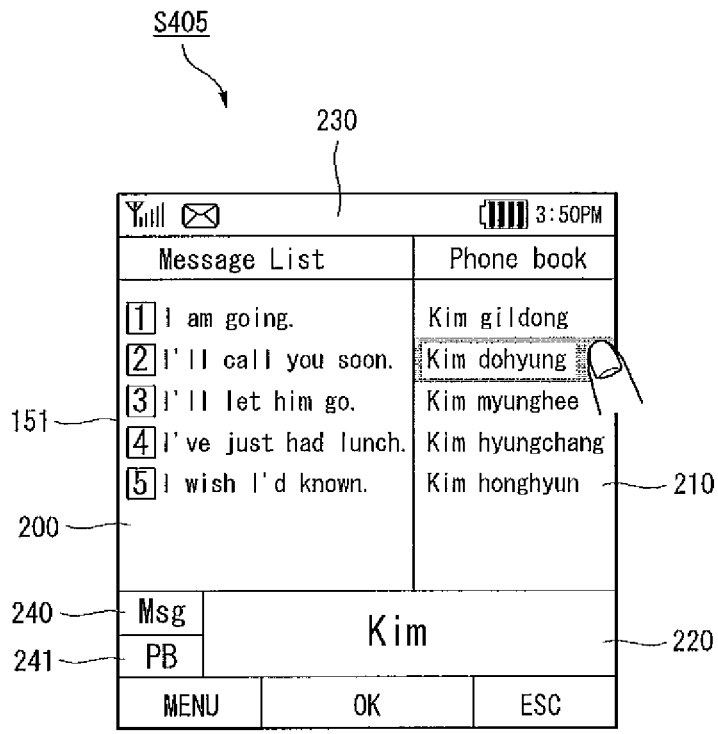
Figure 16B:
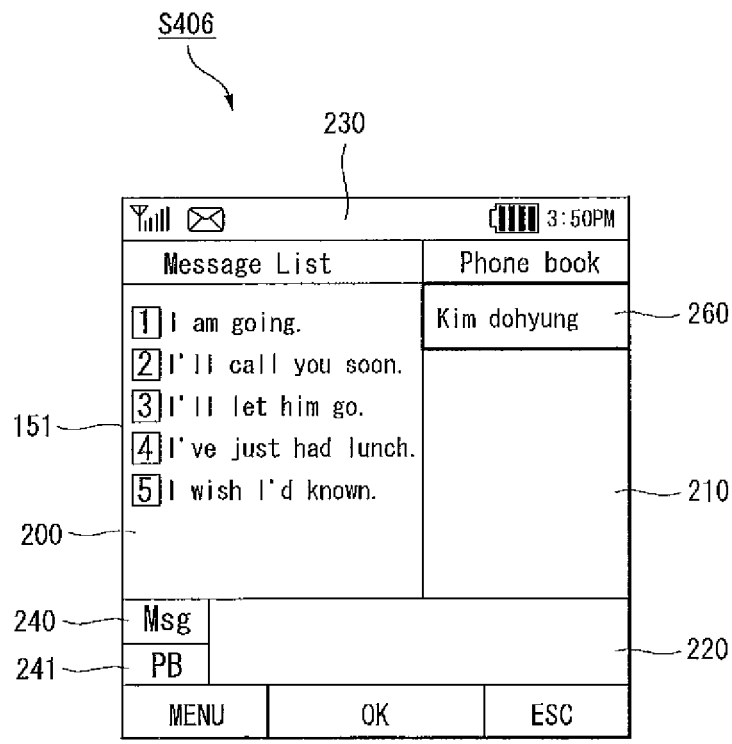

Next, FIGS. 16a-16e are overviews of display screens illustrating another embodiment of the step S400 in FIG. 13. In this embodiment, the user inputs "Kim" through the user input region 220 and touches "Kim dohyung" among phonebook data items displayed in the phonebook search region 210 to select "Kim dohyung" in step S405, as shown in FIG. 16a. Then, the controller 180 displays an additional sub phonebook search region 260 in the inside or outside of the phonebook search region 210 and displays "Kim dohyung" selected in step S405 in the sub phonebook search region 260 in step S406, as shown in FIG. 16b.

Figure 16C:
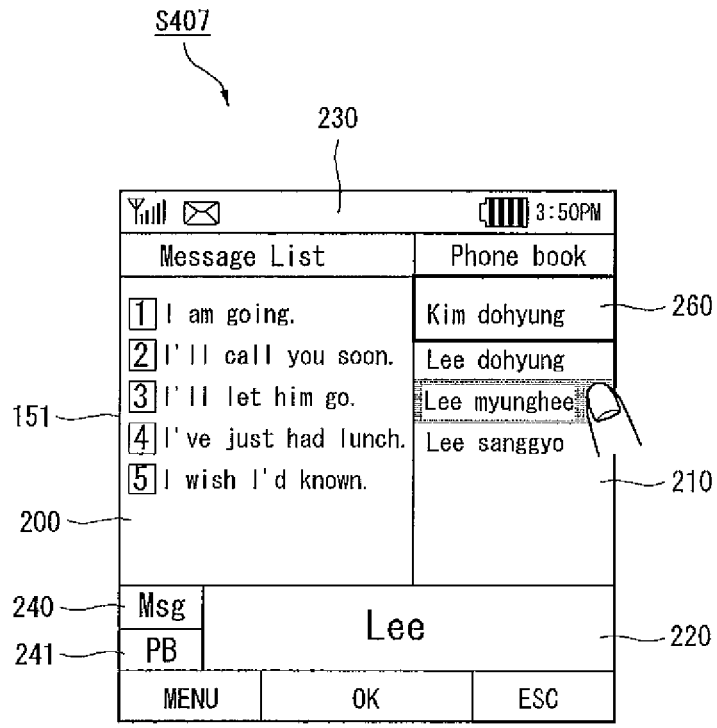
Figure 16D:
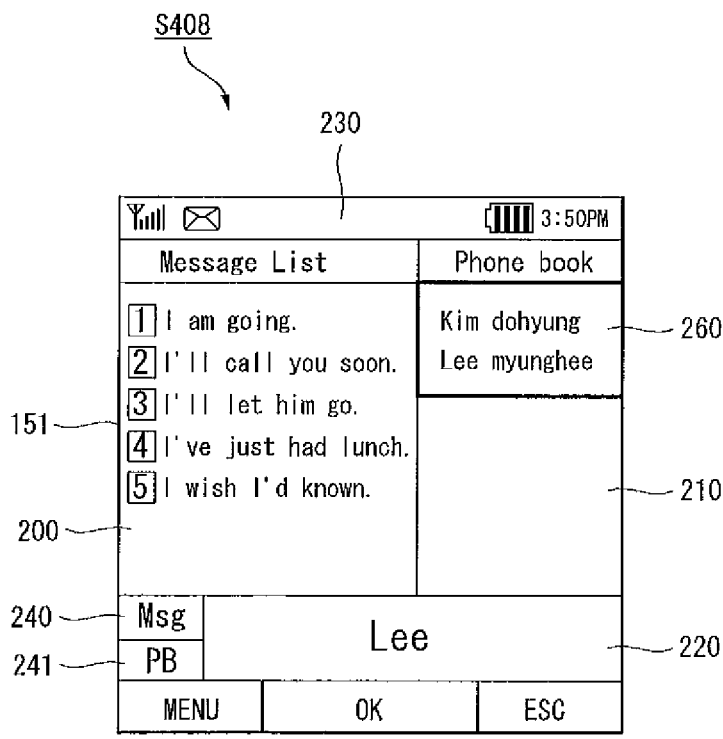
Figure 16E:
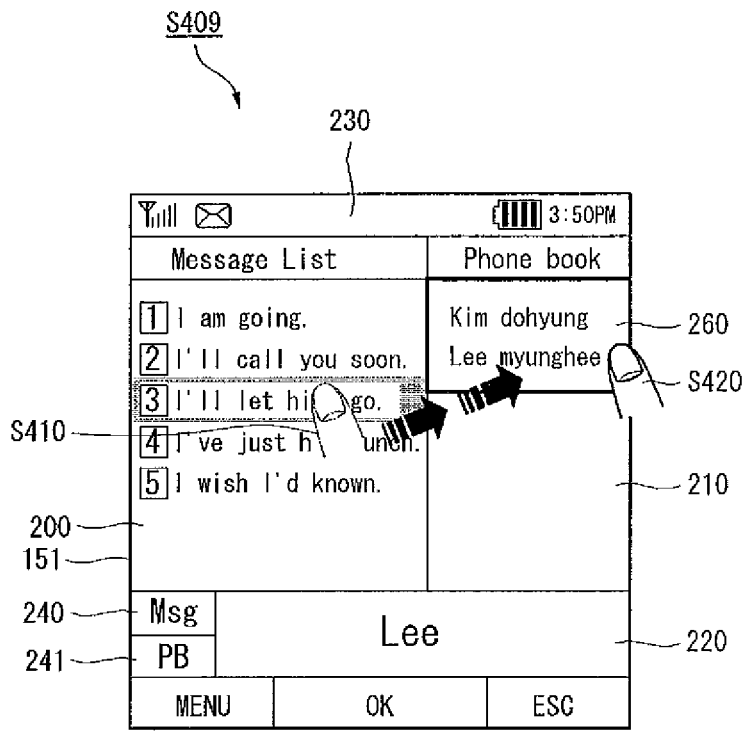

The phonebook data displayed in the sub phonebook search region 260 is currently selected phonebook data. The user then inputs "Lee" through the user input region 220 and touches "Lee myunghee" among phonebook data items displayed in the phonebook search region 210 to select it in step S407, as shown in FIG. 16c. Then, the controller 180 additionally displays "Lee myunghee" in the sub phonebook search region 260 in step S408, as shown in FIG. 16d. Subsequently, the user can perform the steps S410 and S420, as shown in FIG. 16e.

Editing Message in Message List Window

Figure 17:
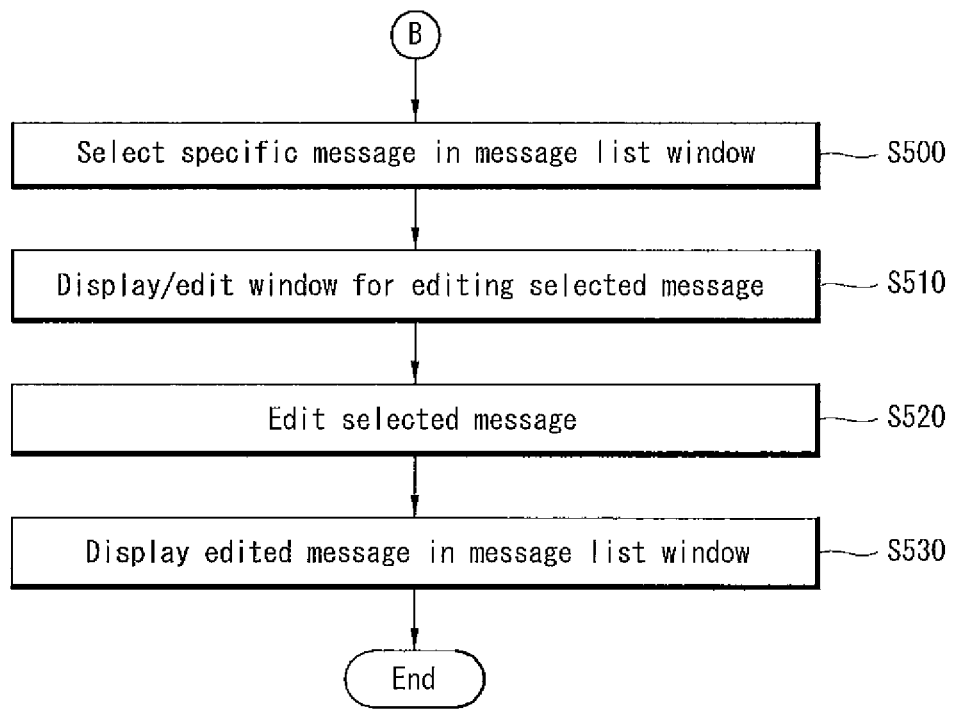
FIG. 17 is a flow chart illustrating a method of processing a message in a mobile terminal with a touch screen according to a fifth embodiment of the present invention.

FIG. 17 is a flow chart illustrating a method of processing a message in a mobile terminal with a touch screen according to a fifth embodiment of the present invention. FIGS. 18a-18d are overviews of display screens illustrating examples of images displayed on the screen of the mobile terminal when the steps in FIG. 17 are performed.

Figure 18A:
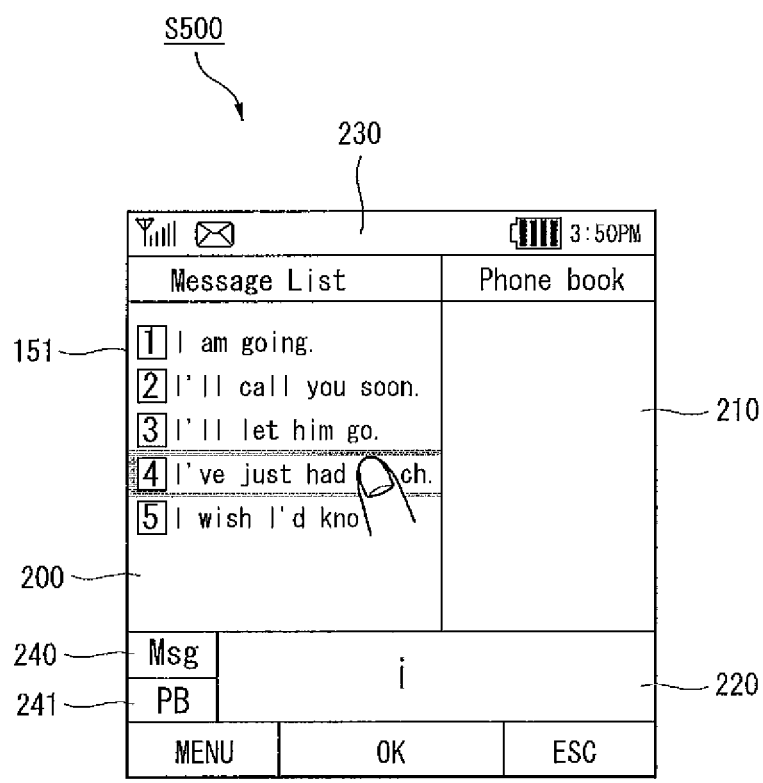
FIGS. 18a-18d are overviews of display screens illustrating examples of images displayed on the screen of the mobile terminal when the steps in FIG. 17 are performed.
Figure 18B:
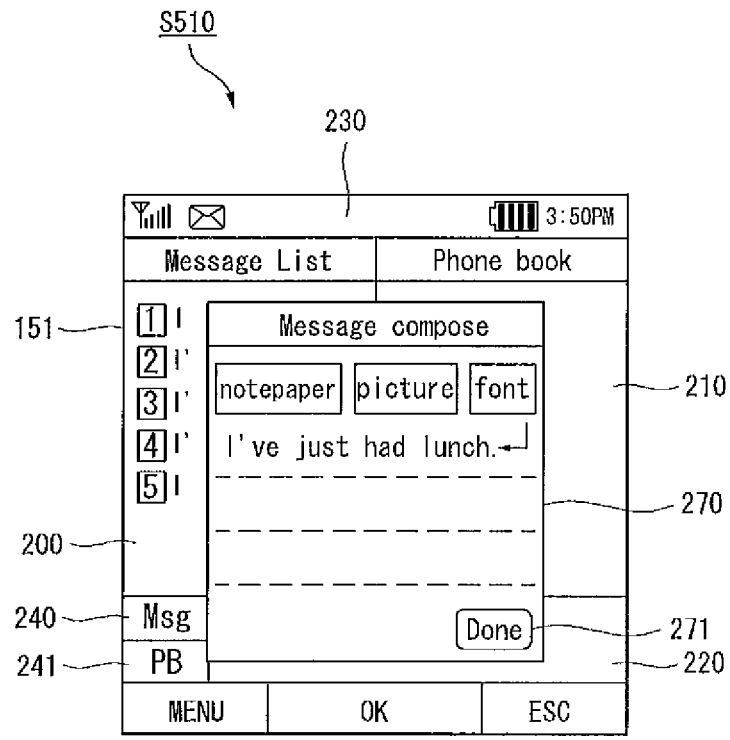

This fifth embodiment of the present invention provides a user interface through which the user can edit a message displayed in the message list region 200. In more detail, when the user selects a specific message in the message list region 200 (step S500) as shown in FIG. 18a, the controller 180 displays an edit window 270 for editing the selected message on the touch screen 151 (step S510), as shown in FIG. 18b.

The user can also select the specific message in various manners in the step S500. In particular, the specific message can be selected in a manner different from the manner of selecting a message to be transmitted. For example, a message to be edited is selected by two touches within a predetermined time in FIG. 18a while a message to be transmitted is selected by one touch in FIG. 15 (refer to S411 and S412 of FIG. 15).

Figure 18C:
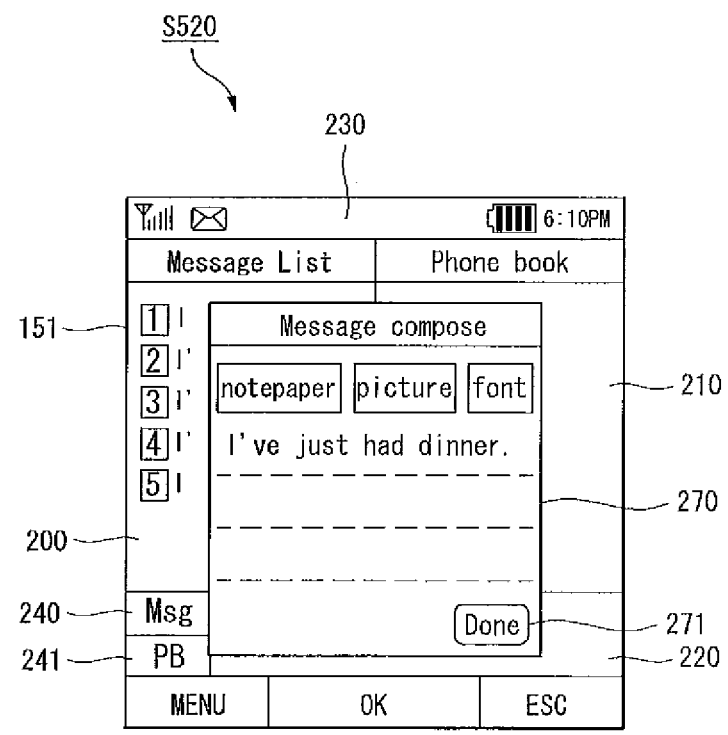

The user can edit the selected message through the edit window 270 (step S520). The edits can include correction and deletion. Further, the user can edit the message through the edit window 270 in various manners. FIG. 18c shows an example of editing the message through the edit window 270.

Figure 18D:
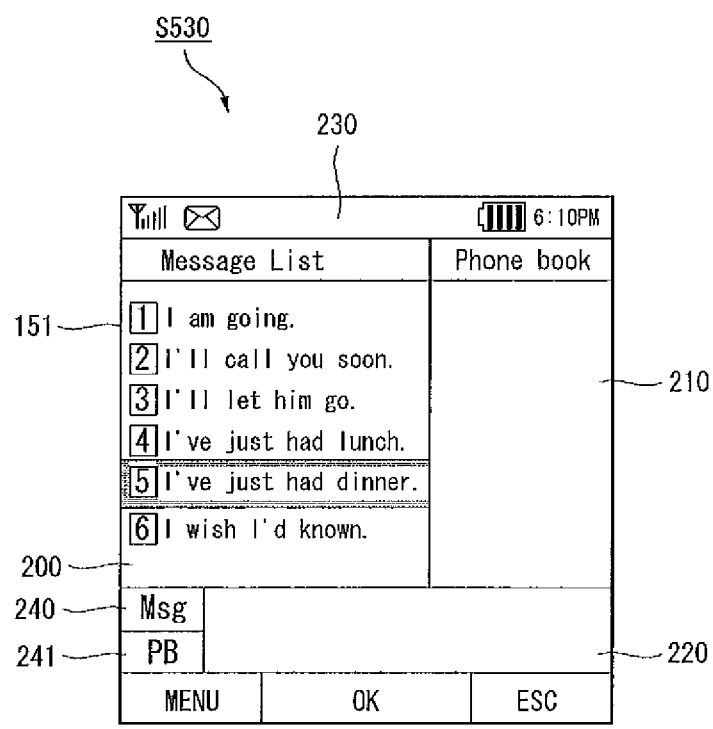

Also, when the user selects a completion button 271 provided to the edit window 270, the editing of the message is completed and the controller 180 displays the edited message in the message list region 200, as shown in FIG. 18d. As shown in FIGS. 18b and 18c, the user can select the "Done" soft button when finished. The user can also select a "note paper" button to create a memo, select a "picture" button to add one or more pictures and a "font" button to set a particular font.

Figure 19A:
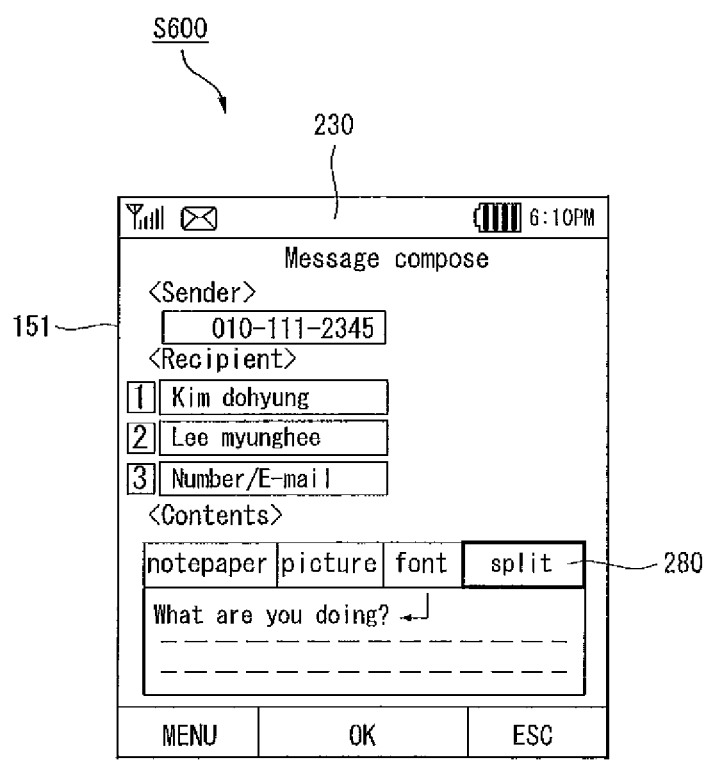
FIGS. 19a-19c are overviews of display screens illustrating a method of processing a message in a mobile terminal with a touch screen according to a sixth embodiment.
Figure 19B:
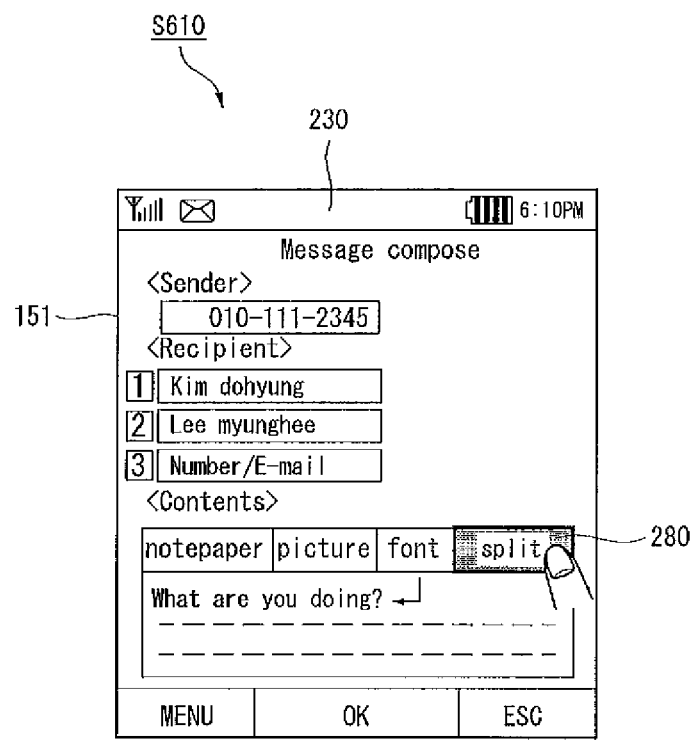
Figure 19C:
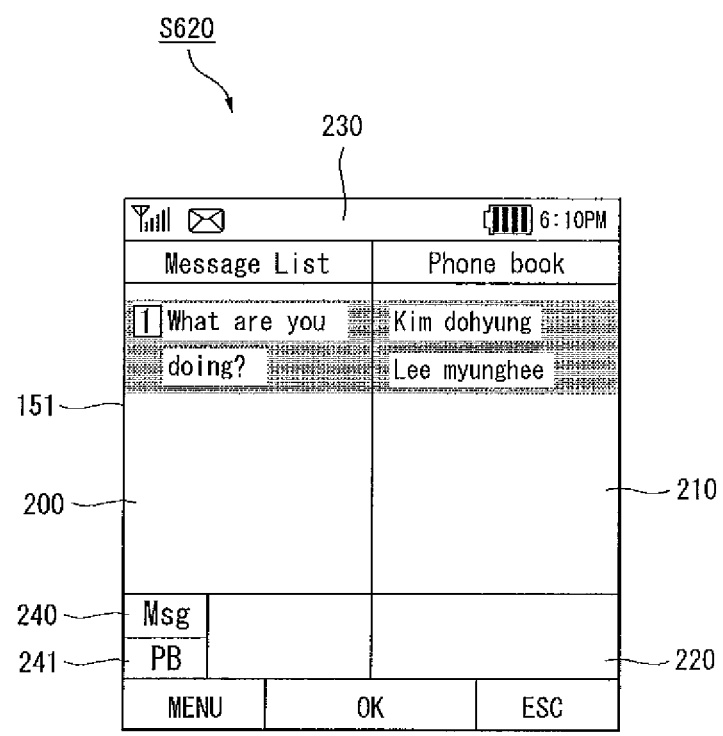

Conversion from Message Composition Window to UI Provided by the Present Invention FIGS. 19a-19c are overviews of display screens illustrating a flow of processing a message in a mobile terminal with a touch screen according to a sixth embodiment of the present invention. The sixth embodiment of the present invention provides a screen split button 280 to a message compose screen. Further, the screen split button 280 is used for the user to traverse through the displayed screens according to the aforementioned embodiments of the present invention.

That is, the user inputs a message through the message composition screen in step S600 as shown in FIG, 19a, and selects the screen split button 280 in step S610 as shown in FIG. 19b. Here, it is assumed that the user designates a message sender and a message recipient in advance. The user can also designate the message sender and the message recipient after going to one of the displayed screens according to embodiments of the present invention.

Upon execution of step S610, the screens according to the aforementioned embodiments of the present invention can be displayed under the control of the controller 180. For example, FIG. 19c shows that the message and the message recipients input in the step shown in FIG. 19a are respectively displayed in the message list region 200 and the phonebook search region 210.

The mobile terminal described in the specification can include a cellular phone, a smart phone, a laptop computer, a digital broadcasting terminal, personal digital assistants (PDA), a portable multimedia player (PMP), a navigation system and so on.

In addition, various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Therefore, according to embodiments of the mobile terminal with a touch screen and corresponding method, it is possible to easily access data required for transmitting a message without searching a menu structure or changing a displayed image. Furthermore, the number of user's operations for transmitting a message is minimized through a drag-and-drop or touch-and-drag operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a display unit configured to simultaneously display, on a touch screen, a message list region for displaying at least part of message data searched in a memory of the mobile terminal, a phonebook list region for displaying at least part of phonebook data searched in the memory, and a user input region for inputting information used to search the message and phonebook data in the memory;
an activating unit configured to activate at least one of the message list region and the phonebook list region, wherein the activating unit comprises a first icon for activating the message list region and a second icon for activating the phonebook list region;
an inputting unit configured to input contents in the user input region; and
a control unit configured to:
search the message data in the memory for the contents input into the user input region and to control the display unit to display at least one message including the contents input through the user input region in the message list region when the message list region is activated via a selecting of the first icon,
search the phonebook data in the memory for the contents input into the user input region and to control the display unit to display at least one phonebook data item including the contents input through the user input region in the phonebook list region when the phonebook list region is activated via a selecting of the second icon,
wherein the message list region, the phonebook list region, and the user input region are contained within a same single display screen without displaying an additional screen on the mobile terminal such that when the contents are input through the user input region, the at least one message including the input contents are displayed in the message list region when the message list region is activated and the at least one phonebook data item including the contents input through the user input region are displayed in the phonebook list region when the phonebook list region is activated,
receive a touch input for selecting one of the at least one message displayed in the message list region,
receive a drag input for moving the selected message to one of the at least one phonebook data item displayed in the phonebook list region, and
transmit the selected message to a recipient corresponding to the phonebook data item to which the drag input is moved.

2. The mobile terminal of claim 1, wherein the control unit is further configured to receive a touch input corresponding to a touching of at least two messages displayed in the message list region and a moving input corresponding to a movement of the touch input to one of the at least one phonebook data item displayed in the phonebook list region, and
wherein the mobile terminal further includes a transmitting unit configured to transmit the touched messages to a recipient corresponding to the phonebook data item to which the touch input is moved.

3. The mobile terminal of claim 1, wherein the control unit is further configured to receive a touch input corresponding to a touching of at least two phonebook data items from the at least one phonebook data item displayed in the phonebook list region, and to receive a touch input corresponding to a touching of one of the at least one message displayed in the message list region and a moving input corresponding to a movement of the touch input to any one of the at least two phonebook data items touched in the phonebook list region, and
wherein the mobile terminal further includes a transmitting unit configured to transmit the touched message to each recipient corresponding to the at least two phonebook data items to which the touch input is moved.

4. The mobile terminal of claim 3, wherein the touch input corresponding to the touching of one of the at least one message comprises a touching of at least two messages displayed in the message list region, and
wherein the transmitting unit is further configured to transmit the at least two touched messages to the each recipient corresponding to the at least two phonebook data items.

5. The mobile terminal of claim 1, wherein the control unit is further configured to receive a touch input corresponding to a touching of one phonebook data item among a plurality of phonebook data items displayed in the phonebook list region,
wherein the control unit is further configured to control the display unit to display only the touched one phonebook data item and to remove the other displayed phonebook data items among said plurality of phonebook data items,
wherein the inputting unit is further configured to input additional contents in the user input region,
wherein the control unit is further configured to control the display unit to display additional phonebook data items including the additional contents input in the user input region,
wherein the control unit is further configured to receive an additional touch input corresponding to a touching of one of the additional phonebook data items, and
wherein the control unit is further configured to control the display unit to display only the touched one additional phonebook data item and to remove the other displayed additional phonebook data items such that only the touched one phonebook data item and the touched additional phonebook data item are displayed in the phonebook search region.

6. The mobile terminal of claim 5, wherein the control unit is further configured to receive a touch input corresponding to a touching of one of the at least one message displayed in the message list region and a moving input corresponding to a movement of the touch input to one of the one phonebook item and the additional phonebook data item displayed in the phonebook list region, and
wherein the mobile terminal further includes a transmitting unit configured to transmit the touched message to recipients corresponding to the one phonebook data item and the additional phonebook data item.

7. The mobile terminal of claim 1, wherein the control unit is further configured to receive a touch input corresponding to a touching of one of the at least one message displayed in the message list region, to control the display unit to display an edit window for editing the touched message on the touch screen, to receive edits for editing the touched message through the edit window, and to control the display unit to display the edited message in the message list region.

8. The mobile terminal of claim 1, further comprising:
a split screen selection unit included in a message composition region used for composing a message and configured to split the message composition region into the simultaneously displayed message list region, phonebook list region, and user input region.

9. A method of controlling a mobile terminal, the method comprising:
simultaneously displaying a message list region for displaying a list part of message data searched in a memory of the mobile terminal, a phonebook list region for displaying at least part of phonebook data searched in the memory, and a user input region on the touch screen for inputting information used to search the message and phonebook data in the memory;
activating at least one of the message list region and the phonebook list region, via an activating unit including a first icon for activating the message list region and a second icon for activating the phonebook list region;
inputting contents in the user input region;
searching the message data in the memory for the contents input into the user input region and displaying at least one message including the contents input through the user input region in the message list region when the message list region is activated via a selecting of the first icon;
searching the phonebook data in the memory for the contents input into the user input region and displaying at least one phonebook data item including the contents input through the user input region in the phonebook list region when the phonebook list region is activated via a selecting of the second icon,
wherein the message list region, the phonebook list region, and the user input region are contained within a same single display screen without displaying an additional screen on the mobile terminal such that when the contents are input through the user input region, the at least one message including the input contents are displayed in the message list region when the message list region is activated and the at least one phonebook data item including the contents input through the user input region are displayed in the phonebook list region when the phonebook list region is activated;
receiving a touch input for selecting one of the at least one message displayed in the message list region;
receiving a drag input for moving the selected message to one of the at least one phonebook data item displayed in the phonebook list region; and
transmitting the selected message to a recipient corresponding to the phonebook data item to which the drag input is moved.

10. The method of claim 9, further comprising:
receiving a touch input corresponding to a touching of at least two messages displayed in the message list region and a moving input corresponding to a movement of the touch input to one of the at least one phonebook data item displayed in the phonebook list region; and
transmitting the touched messages to a recipient corresponding to the phonebook data item to which the touch input is moved.

11. The method of claim 9, further comprising:
receiving a touch input corresponding to a touching of at least two phonebook data items from the at least one phonebook data item displayed in the phonebook list region;
receiving a touch input corresponding to a touching of one of the at least one message displayed in the message list region and a moving input corresponding to a movement of the touch input to any one of the at least two phonebook data items touched in the phonebook list region; and
transmitting the touched message to each recipient corresponding to the at least two phonebook data items to which the touch input is moved.

12. The method of claim 11, wherein the touch input corresponding to the touching of one of the at least one message comprises a touching of at least two messages displayed in the message list region, and
wherein the transmitting step transmits the at least two touched messages to the each recipient corresponding to the at least two phonebook data items.

13. The method of claim 9, further comprising:
receiving a touch input corresponding to a touching of one phonebook data item among a plurality of phonebook data items displayed in the phonebook list region,
wherein displaying the at least one phonebook data item displays only the touched one phonebook data item and removes the other displayed phonebook data items among said plurality of phonebook data items,
wherein inputting the contents in the user input region further comprises inputting additional contents in the user input region,
wherein displaying the at least one phonebook data item further comprises displaying additional phonebook data items including the additional contents input in the user input region,
wherein receiving the touch input further comprises receiving an additional touch input corresponding to a touching of one of the additional phonebook data items, and
wherein displaying the additional phonebook data items displays only the touched one additional phonebook data item and removes the other displayed additional phonebook data items such that only the touched one phonebook data item and the touched additional phonebook data item are displayed in the phonebook list region.

14. The method of claim 13, further comprising:
receiving a touch input corresponding to a touching of one of the at least one message displayed in the message list region and a moving input corresponding to a movement of the touch input to one of the one phonebook item and the additional phonebook data item displayed in the phonebook list region; and transmitting the touched message to recipients corresponding to the one phonebook data item and the additional phonebook data item.

15. The method of claim 9, further comprising:

receiving a touch input corresponding to a touching of one of the at least one message displayed in the message list region;

displaying an edit window for editing the touched message on the touch screen;

receiving edits for editing the touched message through the edit window; and displaying the edited message in the message list region.

16. The method of claim 9, wherein simultaneously displaying the message list region, the phonebook list region, and the user input region occurs in response to a selection of split screen button selected from a message composition region used for composing a message.

* * * * *